US010777020B2

(12) United States Patent
    Aluru et al.

(10) Patent No.: US 10,777,020 B2
(45) Date of Patent: Sep. 15, 2020

(54) VIRTUAL REPRESENTATION CREATION OF USER FOR FIT AND STYLE OF APPAREL AND ACCESSORIES

(71) Applicant: Soul Vision Creations Private Limited, Bangalore (IN)

(72) Inventors: Sravanth Aluru, Bangalore (IN); Gaurav Baid, Bangalore (IN); Amit Tomar, Bangalore (IN)

(73) Assignee: Soul Vision Creations Private Limited (IN)

( * ) Notice: Subject to any disclaimer, the term of this patent is extended or adjusted under 35 U.S.C. 154(b) by 0 days.

(21) Appl. No.: 16/204,883

(22) Filed: Nov. 29, 2018

(65) Prior Publication Data

US 2019/0266806 A1    Aug. 29, 2019

Related U.S. Application Data

(60) Provisional application No. 62/636,157, filed on Feb. 27, 2018.

(51) Int. Cl.
    *G06T 19/20*     (2011.01)
    *G06F 16/54*    (2019.01)
    (Continued)

(52) U.S. Cl.
    CPC .............. *G06T 19/20* (2013.01); *G06F 16/54* (2019.01); *G06F 30/20* (2020.01);
    (Continued)

(58) Field of Classification Search
    None
    See application file for complete search history.

(56) References Cited

U.S. PATENT DOCUMENTS

| 4,926,344 | A | 5/1990 | Collins et al. |
| 6,546,309 | B1 * | 4/2003 | Gazzuolo ........... G06Q 30/0601 33/512 |

(Continued)

FOREIGN PATENT DOCUMENTS

| EP | 3234925 A1 | 10/2017 |
| GB | 2488237 A | 8/2012 |

(Continued)

OTHER PUBLICATIONS

Abdulla, "Mask R-CNN for Object Detection and Segmentation," GitHub repository, accessed from https://github.com/matterport/Mask_RCNN , 2017, 15 pp. (Applicant points out, in accordance with MPEP 609.04(a), that the year of publication, 2017, is sufficiently earlier than the effective U.S. filing date, so that the particular month of publication is not in issue.).

(Continued)

*Primary Examiner* — Yi Wang
(74) *Attorney, Agent, or Firm* — Shumaker & Sieffert, P.A.

(57) ABSTRACT

This disclosure describes example techniques for personalized virtual look, fit, and animation of apparel, accessories, and cosmetics on a virtual representation of a user. The disclosure describes way to deliver an immersive 3D digital experience for style and fit. Processing circuitry of one or more computing devices may create the virtual representation of the user based on an image of the face of the user and a selected body type in real-time.

18 Claims, 8 Drawing Sheets

(51) Int. Cl.
    *G06K 9/00* (2006.01)
    *G06T 15/00* (2011.01)
    *G06T 15/04* (2011.01)
    *G06T 13/40* (2011.01)
    *G06T 17/20* (2006.01)
    *G06Q 30/06* (2012.01)
    *G06T 17/10* (2006.01)
    *G06F 30/20* (2020.01)

(52) U.S. Cl.
    CPC ..... *G06K 9/00275* (2013.01); *G06K 9/00281* (2013.01); *G06Q 30/0627* (2013.01); *G06T 13/40* (2013.01); *G06T 15/005* (2013.01); *G06T 15/04* (2013.01); *G06T 17/10* (2013.01); *G06T 17/20* (2013.01); *G06T 2210/16* (2013.01)

(56) References Cited

U.S. PATENT DOCUMENTS

| | | | |
|---|---|---|---|
| 2002/0021297 A1* | 2/2002 | Weaver | A41H 3/007 345/420 |
| 2009/0132371 A1* | 5/2009 | Strietzel | G06Q 30/02 705/14.46 |
| 2010/0030578 A1 | 2/2010 | Siddique et al. | |
| 2010/0050088 A1 | 2/2010 | Neustaedter et al. | |
| 2011/0298897 A1 | 12/2011 | Sareen et al. | |
| 2013/0325493 A1* | 12/2013 | Wong | G06F 19/00 705/2 |
| 2014/0160122 A1 | 6/2014 | Chou | |
| 2015/0042663 A1 | 2/2015 | Mandel et al. | |
| 2016/0088284 A1 | 3/2016 | Sareen et al. | |
| 2017/0161948 A1 | 6/2017 | Hua et al. | |
| 2019/0035133 A1 | 1/2019 | Jiao et al. | |
| 2019/0035149 A1* | 1/2019 | Chen | G06T 15/04 |

FOREIGN PATENT DOCUMENTS

| | | |
|---|---|---|
| JP | 2002024319 A | 1/2002 |
| WO | 2016138481 A1 | 9/2016 |

OTHER PUBLICATIONS

Chang et al., "Palette-based Photo Recoloring," ACM Transactions on Graphics (Proceedings of SIGGRAPH), vol. 34, No. 4, Jul. 2015, 11 pp.

He et al., "Mask R-CNN," IEEE International Conference on Computer Vision (ICCV), ArXiv, Jan. 2018, 12 pp.

Long et al., "Fully Convolutional Networks for Semantic Segmentation," IEEE International Conference on Computer Vision and Pattern Recognition (CVPR), Mar. 2015, 10 pp.

YouTube, "Avataar.Me-Decoded Future: Talk on AR for Fashion," retrieved from https://www.youtube.com/watch?v=uq3PlpBisi4 &feature=youtu.be, uploaded on Jul. 5, 2018 by user Avataar Me, 1 pp.

U.S. Appl. No. 16/204,934, filed Nov. 29, 2018, naming inventors Aluru et al.

U.S. Appl. No. 16/204,973, filed Nov. 29, 2018, naming inventors Aluru et al.

Non-Final Office Action from U.S. Appl. No. 16/204,973 dated Oct. 3, 2019 (31 pp.).

Response to Non-Final Office Action from U.S. Appl. No. 16/204,973 dated Oct. 3, 2019 filed Jan. 3, 2020 (10 pp).

Non-Final Office Action from U.S. Appl. No. 16/204,934 dated Jan. 30, 2020 (33 pp).

Final Office Action from U.S. Appl. No. 16/204,973 dated Feb. 7, 2020 (36 pp).

International Search Report and Written Opinion of International Application No. PCT/IN2019/050141, dated Jun. 14, 2019, 9 pp.

Yuan et al., "A Mixed Reality Virtual Clothes Try-On System," IEEE Transaction on Multimedia, vol. 16, No. 1, Jan. 2014, 11 pp.

\* cited by examiner

VIRTUAL REPRESENTATION CREATION OF USER FOR FIT AND STYLE OF APPAREL AND ACCESSORIES This application claims the benefit of U.S. Provisional Application No. 62/636,157, filed Feb. 27, 2018, the entire contents of which is incorporated herein by reference.

TECHNICAL FIELD

The disclosure relates to computerized virtual representation creation.

BACKGROUND

Online retail and e-commerce are increasingly taking market share from on-premise traditional brick and mortar retailers. When shopping at brick and mortar retailers, a customer can try on apparel and accessories to ensure the right fit and style. When shopping online, a customer is limited in his or her ability to ensure the right fit and style due to the inability to try on the apparel and accessories.

SUMMARY

In general, the disclosure describes example techniques of real-time rendering of virtual representations of a user, e.g., so-called avatars, that can be displayed on a personal computing device. As described in more detail, processing circuitry of one or more network computing devices receives an image of the user and performs deformations on a virtual head representation based on facial features of the user in the image. In addition, the processing circuitry selects a body type from a plurality of body types for the user based on body type information. In one or more examples, the plurality of body types may be configured such that the body type substantially aligns with a neck seam of the virtual head representation.

In some examples, the processing circuitry selects a particular virtual head representation from a plurality of virtual head representations such as based on facial recognition of features in the image. The processing circuitry deforms a head portion of the virtual head representation based on the facial features, but may not deform a neck seam of the virtual head representation (e.g., the processing circuitry may bypass or avoid deforming the neck seam). Because each of the plurality of body types is configured to substantially align with a neck seam of the virtual head representation, and the neck seam of the virtual head representation may not be deformed, the processing circuitry may be able to quickly render the deformed head portion of the virtual head representation with the selected body type to form a seamless virtual representation of the user.

In one example, the disclosure describes a method of virtual representation creation, the method comprising receiving an image of a user, deforming a virtual head representation based on facial features in the image, wherein the virtual head representation includes a head portion and a neck seam, and wherein deforming the virtual head representation comprises deforming the head portion, and avoiding deforming the neck seam, rendering the deformed virtual head representation with a body type based on aligning the body type with a neck seam of the deformed virtual head representation to create a virtual representation of the user, and outputting graphical information based on the virtual representation of the user.

In one example, the disclosure describes a system comprising memory configured to store a virtual head representation and processing circuitry. The processing circuitry is configured to receive an image of a user, deform a virtual head representation based on facial features in the image, wherein the virtual head representation includes a head portion and a neck seam, and wherein to deform the virtual head representation, the processing circuitry is configured to deform the head portion, and avoid deforming the neck seam, render the deformed virtual head representation with a body type based on aligning the body type with a neck seam of the deformed virtual head representation to create a virtual representation of the user, and output graphical information based on the virtual representation of the user.

In one example, the disclosure describes a computer-readable storage medium having instructions stored thereon that when executed cause processing circuitry to receive an image of a user, deform a virtual head representation based on facial features in the image, wherein the virtual head representation includes a head portion and a neck seam, and wherein the instructions that cause the processing circuitry to deform the virtual head representation comprise instructions that cause the processing circuitry to deform the head portion, and avoid deforming the neck seam, render the deformed virtual head representation with a body type based on aligning the body type with a neck seam of the deformed virtual head representation to create a virtual representation of the user, and output graphical information based on the virtual representation of the user.

In one example, the disclosure describes a system that includes means for receiving an image of a user, means for deforming a virtual head representation based on facial features in the image, wherein the virtual head representation includes a head portion and a neck seam, and wherein the means for deforming the virtual head representation comprises means for deforming the head portion, and avoiding deforming the neck seam, means for rendering the deformed virtual head representation with a body type based on aligning the body type with a neck seam of the deformed virtual head representation to create a virtual representation of the user, and means for outputting graphical information based on the virtual representation of the user.

The details of one or more examples are set forth in the accompanying drawings and the description below. Other features, objects, and advantages will be apparent from the description and drawings, and from the claims.

DETAILED DESCRIPTION

Figure 1:
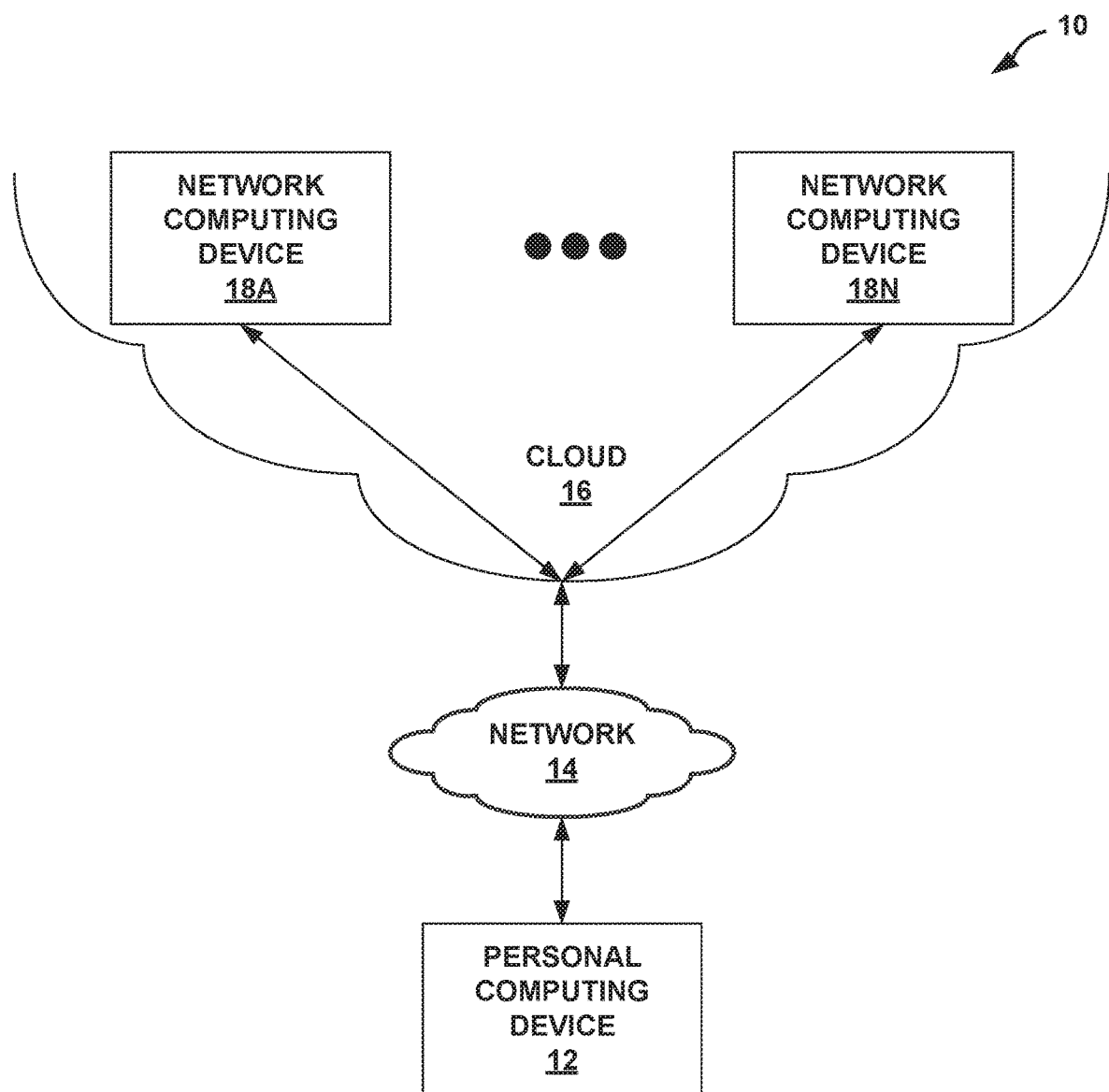
FIG. 1 is a block diagram illustrating a system for creating virtual representations of users in accordance with one or more example techniques described in this disclosure.

Online retail and e-commerce are increasingly taking market share from on premise traditional brick and mortar retailers. However, the online shopping experience, especially in fashion—apparels, accessories, beauty and personal care—has drawbacks compared to an experience in a physical store. In some cases, consumers discover and purchase fashion products online by evaluating static two-dimensional (2D) images of the fashion products on brand ambassadors or models. There is no ability for the customers to try before they buy as in a physical store and nor is the shopping experience personalized to the consumer.

There are some online virtual try-on experiences, but the options are limited. Virtual try-on means a user viewing how a virtual representation of an apparel or accessory would look when worn by the user. Some virtual try-on experiences are not personalized, and the virtualized accessories and apparel cannot be displayed together. These techniques are not well suited for real-time rendering on personal computing devices, such as mobile devices (e.g., smart phones or tablets) or laptops, on which many users view and purchase apparel and accessories.

This disclosure describes example techniques to generate a virtual representation of a user in real-time, as well as virtual representations of apparel and accessories in real-time, so that the user can determine the fit and style of the apparel and accessories. For example, a user may view how the apparel and accessories appear together on his or her body, as opposed to seeing the apparel and accessories separately on bodies that may not accurately reflect the user's body.

As described in more detail below, a user may take a picture of himself or herself (e.g., a "selfie"), and upload the picture to one or more network computing devices (e.g., one or more servers located in a cloud-computing infrastructure coupled to the personal computing device of the user via the Internet). In cloud-computing, operations to be performed in the cloud may be divided or shared across one or more network computing devices. Hence, in this disclosure operations described with respect to a network computing device should be understood to also encompass examples where the operations are shared or divided across multiple network computing devices.

The network computing device may determine facial features in the image. For example, the network computing device may determine key points on the user's face (e.g., locations of cheek bones, nose, eyes, mouth, etc.) and determine relative distances between the key points to determine the facial features. Based on the relative distance, the network computing device may determine deformations to apply to a default deformable 3D face, also called a virtual head representation. The virtual head representation may be a mesh of primitives arranged to appear like a human head. The virtual head representation is "deformable" in the sense that the vertices of the primitives in the mesh can be rearranged to form different head and face shapes.

In some examples, there may be a plurality of virtual head representations. The network computing device may utilize the facial features to select one of the plurality of virtual head representations to deform. As one example, the plurality of virtual head representations may be clustered together based on common features (e.g., virtual head representations having the same eye separation form one cluster, virtual head representations having the same nose to lips distance form one cluster, etc.). Based on the facial features, the network computing device may determine a cluster from the plurality of clusters for the virtual head representations. The network computing device may then select one of the virtual head representations from the determined cluster that most closely matches the head of the user.

In addition, the user may provide body type information (e.g., bust size, waist size, shoulder width, etc.). In some examples, rather than manually entering body type information, the user may upload an image of the his or her body from which the network computing device determines the body type information. Based on the body type information, the network computing device may select a body type from a plurality of body types. The network computing device may render the deformed virtual head representation with the selected body type to create a virtual representation of the user and output graphical information of the virtual representation to the personal computing device of the user for the user to view.

In examples where the network computing device selects a virtual head representation from a plurality of virtual head representations, each of the plurality of virtual head representations may be associated with a set of body types from the total plurality of body types. For reasons described in more detail below, the set of body types associated with a particular virtual head representation may have the characteristic that a neck seam of the set of body types aligns substantially with the particular virtual head representation with which the set of body types are associated. In one or more examples, after selecting the virtual head representation, the network computing device may select the body type from the set of body types associated with the selected virtual head representation.

By deforming the virtual head representation and selecting a body type, the example techniques described in this disclosure may provide the technical advantage of reducing computations, relative to other techniques, to ensure real-time virtual representation creation. For example, if the network computing device had to deform both head and body, then there may be additional computation cycles needed, which may slow down the virtual representation creation, and possibly slow down the virtual representation creation for purposes of the user to view fit and style. The user may want more immediate display to view fit and style than would be available if the entire user body had to be deformed.

However, there may be additional technical problems to address to achieve real-time virtual representation creation. For instance, the virtual head representation is deformed, and the body type is separately selected. When the deformed virtual head representation (e.g., deformed default deformable 3D face) is rendered with the selected body type, there could be image distortions because of misalignment between the selected body type and the deformed virtual head representation. In one or more examples, the plurality of body types, from which a body type is selected for rendering, may each be configured to align with a neck seam of the virtual head representation (e.g., default deformable 3D face). Alignment of the neck seams means that the ends of the neck seams line up, and the curvature of the neck seams line up such that when the neck seam of the virtual head representation and the neck seam of the body type line up to form a contiguous connection between head and body, with little to no gaps or such that the neck seam of the virtual head representation does not extend beyond the neck seam of the body type, and vice-versa.

As part of the deforming, the network computing device may deform the head portion of the virtual head representation, and may avoid deforming (e.g., bypass deforming) the neck seam of the virtual head representation. In this way, in the deformed virtual head representation, the neck seam is the same as it was in the virtual head representation, before deforming, but the head portion may be deformed to look more like the user. Because the neck seam is the same, the network computing device may be able to render the deformed virtual head representation with the selected body type with minimal distortions at the interconnection of the head and body.

With a virtual representation of the user, the network computing device may be able to render apparel and accessories over the virtual representation to give the user a real-life showing of how the apparel and accessories will appear on the user. In some examples, the network computing device may store information indicating the way in which deformations were applied to the virtual head representation so that the network computing device can similarly deform accessories so that the user can determine how the accessories will look on the user.

Moreover, in some examples, in rendering the virtual representation, the network computing device may utilize "rigged" virtual head representations and body types. Rigged virtual head representations and body types means that the virtual head representations and body types also include anatomical information such as primitives that define skeletal and muscle structure. With the use of rigged virtual head representations and body types, the network computing device may be able to add movement and animation to provide the user with an even better understanding of the style and fit of the apparel and accessories.

FIG. 1 is a block diagram illustrating a system 10 for creating virtual representations of users in accordance with one or more example techniques described in this disclosure. As illustrated, system 10 includes personal computing device 12, network 14, and cloud 16. Cloud 16 includes network computing devices 18A-18N (collectively referred to as "network computing devices 18").

Examples of personal computing device 12 include mobile computing devices (e.g., tablets or smartphones), laptop or desktop computers, e-book readers, digital cameras, video gaming devices, and the like. In one or more examples, a user of personal computing device 12 may shop for apparel and accessories online. For example, the user may access online retailers and shift through their items to identify apparel or accessories to purchase. In some examples, the user of personal computing device 12 may be scrolling through content from various websites, and some apparel or accessories may pique his or her interest.

The user may be interested in determining whether to purchase the item or not but may not have access to a retailer where he or she can try on the item for fit and style. In some cases, even where retailer access is available, the user may desire to make more of an on-the-spot determination of whether the item will look good when worn. Moreover, the user may wish to ask friends and family of their opinion and taking everyone to the retailer may not be practical.

In the example techniques described in this disclosure, the user may create a virtual representation of himself or herself via personal computing device 12. The user may use the virtual representation to virtually try-on apparels and accessories to determine whether the style and fit is one he or she would want. The user may also be able to share (e.g., via social media or some other form) the virtual representation with the virtual apparels and accessories with friends and family to solicit opinions.

For determining the style and fit of the apparel and accessories, it may be possible that the user will cycle through many options or try many different combinations. To ensure high quality interaction, the user may desire that the virtual representation is created relatively quickly (e.g., in run-time). As described in more detail, this disclosure describes techniques to create such virtual representations in run-time allowing for the user to quickly view the apparel and accessories.

To create the virtual representation, the user may take an image of himself or herself (e.g., a selfie). The image should include the face of the user and can include other body parts as well. In some examples, rather than taking the image, the user may retrieve a previously stored image. For example, the user may either take a picture using his or her camera or use an already existing picture which has a frontal snapshot of the user's face. This can either be a 2D image, taken from a regular camera on mobile, desktop, etc., or a 3D depth image, taken from a 3D depth sensing camera.

The user may upload the image of the face of the user to one or more network computing devices 18 for further processing. In addition, the user may upload body type information, or upload images that show the body to one or more network computing devices 18 for further processing. One or more network computing devices 18 may generate a virtual representation of the user based on the image and the body type information. For example, network computing devices 18 may provide responsive real-time cloud services that can, on a responsive real-time basis, generate custom 3D virtual representations (e.g., avatars) using a 2D frontal face selfie or using a 3D depth camera image of the frontal face along with a few body measurements or full body pictures which can be used to programmatically approximate user body measurements provided by the user.

As illustrated, network computing devices 18 are within cloud 16. Cloud 16 represents a cloud infrastructure that supports multiple network computing devices 18 on which applications or operations requested by one or more users run. For example, cloud 16 provides cloud computing for using network computing devices 18, hosted on network 14, to store, manage, and process data, rather than at personal computing device 12.

Network 14 may transport data between network computing devices 18 of cloud 16 and personal computing device 12. For example, network 14 may form part a packet-based network, such as a local area network, a wide-area network, or a global network such as the Internet. Network 14 may include routers, switches, base stations, or any other equipment that may be useful to facilitate data between personal computing device 12 and network computing devices 18.

Examples of network computing devices 18 include server devices that provide functionality to personal computing device 12. For example, network computing devices 18, in cloud 16, may share data or resources for performing computations for personal computing device 12. As one example, network computing devices 18 may be computing servers, but the example techniques are not so limited.

Network computing devices 18 may be a combination of computing servers, web servers, database servers, and the like.

For example, network computing devices 18 may host an application, executing on processing circuitry, via which network computing devices 18 receive the image uploaded by the user and the body type information (e.g., as images or user input). The processing circuitry encompasses the processing circuitry of one or more of network computing devices 18 that together perform the example techniques described in this disclosure.

The processing circuitry of network computing devices 18 may determine key features on the face of the user from the image and determine 3D facial shape contours to estimate the face shape and contour of the user. Based on the facial shape contours, the processing circuitry of network computing devices 18 may select a default deformable 3D face model (referred to as a virtual head representation) and determine deformations to apply to the virtual head representation. By deforming the virtual head representation based on the determined deformations, the virtual head representation can be formed to appear like the head of the user.

For example, the virtual head representation may be a 3D mesh of primitives that looks like a human head. Network computing devices 18 may store information of the 3D mesh of primitives, such as vertices of the primitives and interconnection information. The deformations that the processing circuitry of network computing devices 18 determine may be how to shift and adjust the primitives within the 3D mesh of the virtual head representation so that deformed virtual head representation appears like the head of the user.

The following describes example techniques for performing the deformations (e.g., shifts and adjustments to the primitives). The face portion may be defined by a number of coordinate vectors (referred to as "vertex positions" and uv maps for texture application). Combined, these are referred to as "face space." The virtual head representation is created with parametric controls to modify the coordinate vectors (vertex positions) defined in the face space, and the vertex ordering is preserved as in the face space.

In one example, the processing circuitry may extract the 2D face selfie region which corresponds to the 3D face shape. To have a consistent approach across user faces for both genders, a face selfie where hair does not cover the face in the selfie may be preferred. In case of long hair styles, the user may pull their hair back before taking their face selfie. Further, the efficacy of depth extrapolation from the 2D face selfie that defines the vertex positions for the user face shape, may be based on good even lighting across the selfie. Presence of shine, shadows or strong directional lights from one side, create algorithmic challenges to accurately extrapolate relative depth based on light gradients. Similarly, too bright or too dark light is not ideal. Accordingly, the user may take a selfie with well-lit diffused lighting conditions.

The facial feature points from the input user face selfie are identified to extract the 2D face selfie region that corresponds to the 3D face space. This is done using common deep learning image recognition techniques to identify the key points (e.g., jaw line, center of eye balls, nose region, lips, etc.). Once done, the depth information for the user face space (i.e., the vertex positions) to define the user face shape is extrapolated along with the texture color for the face space which helps create the user face space.

The vertex positions calculated for the face shape from the selfie is then used to update the positional information using the parametric controls for the virtual head representation to align the vertex positions with the user face space and create the virtual head representation for the user.

In some examples, rather than relying upon the 2D image to determine depth, it may be possible to retrieve depth information from the user. For instance, some next generation devices, such as iPhone® X+, have 3D depth sending capabilities. In such cases, rather than extrapolating depth from a 2D selfie, the processing circuitry can receive the 3D depth information along with the texture to create the user space described above.

There are various ways in which the network computing devices 18 perform the example deformation. The above is one example, and the techniques should not be considered limited. In general, the processing circuitry may use the facial features points (e.g., key features) from the image, and extrapolate spatial relative depth information for the face region. Based on the spatial relative depth information, the processing circuitry may determine where the same key features on the virtual head representation are to be shifted or adjusted. For instance, the processing circuitry may determine a difference in where the key features are currently located on the virtual head representation and where these key features are to be located on the virtual head representation. Based on the difference, the processing circuitry may determine how the primitives within the 3D mesh of the virtual head representation should be shifted or adjusted. The processing circuitry may apply a surface smoothing to modify the shape of the rest of the virtual head representation with respect to changes made to the face region.

The processing circuitry of network computing devices 18 may deform the virtual head representation based on the determined deformation; however, in some examples, for reasons described in more detail below, the processing circuitry may avoid deforming a neck seam of the virtual head representation. For example, the processing circuitry may not deform the base of the neck (e.g., neck seam). The processing circuitry may apply deformations to a neck portion of the virtual head representation. The processing circuitry may apply slight deformation closer to the neck seam and gradually increase the deformations applied for higher portions of the neck.

In addition to the deformations, the processing circuitry may be configured to select a body type of the user based on the user provided body type information. Examples of the body type information include height, waist, bust, hip, and/or weight measurements, and/or visual body type selection such as apple, pear, rectangle, etc. These measurements may be adequate from a fit perspective for standard machine-manufactured apparel as the apparel is designed on similar body types. There may be more or fewer examples of body type information that the user provides, and the examples are not limited to the above examples.

In some examples, the processing circuitry may deduce the body type information from full body pictures provided by the user. This may help the user avoid having to enter measurements. However, as users are likely to wear different sizes of apparels in different pictures (e.g., some loose; some tight fitting), the user may need to provide multiple pictures for the processing circuitry to determine an accurate estimation of user body measurements.

The processing circuitry may use the body type information to select a body type that is the best fit for the user. For example, network computing devices 18 may store information for a plurality of body types (e.g., different shapes and sizes of bodies). The body types that network computing devices store may be virtualized body types. Based on the body type information, the processing circuitry may determine which of the plurality of body types is the closest match.

For example, the processing circuitry may determine the nearest virtual body type match of the body measurements from a database of pre-modelled 3D body avatars without face or neck (e.g., a database of a plurality of virtualized body types). The processing circuitry may match the measurements and anthropometric ratios provided by the user vis-à-vis the measurements and anthropometric ratios of the virtualized body types.

By separating out the forming of the face portion of the user from the body creation, the processing circuitry may be configured to generate the graphical representation more quickly than some other techniques to achieve the real-time rendering of the graphical representation. For example, it may be possible for the user to take an image of the entire body and face and upload that image. Network computing devices 18 may then determine deformations for the entire body and face based on the image and deform a mesh of primitives that represents the entire human body. However, performing such operations on the entire body of the user may be complex and time consuming. In one or more example techniques, network computing devices 18 may apply deformations on the head portion and select a body type from pre-generated and stored virtualized body types, rather than determine and apply deformations to the body to create the virtual representation of the user.

Accordingly, there may be technical advantages with the example techniques to achieve run-time virtual representation creation. However, some additional technical solutions may be needed to achieve the technical advantages. For example, because the head portion of the user is separated formed than the body portion, when rendering the head portion and the body portion together to form the virtual representation, there may be distortions.

In one or more examples, the plurality of pre-generated and stored virtualized body types may be pre-generated such that the top of the body types substantially aligns (e.g., such that there is minimal distortion) with the neck seam of the virtual head representation before any deformations. To ensure that the alignment between the neck seam of the virtual head representation and the top of the plurality of body types persists after deformation of the head portion of the virtual head representation, the processing circuitry of one or more network computing devices 18 may not (e.g., may avoid) deform the neck seam of the virtual head representation. Again, the neck seam is at the base of the neck and stops near the beginning of the clavicle. However, the neck seam may include more or less anatomical portions of the body.

By avoiding the deformation of the neck seam, the processing circuitry may ensure that prior to and post deformation of the head portion of the virtual head representation, the deformed virtual head representation will still substantially align with the selected body type. As the processing circuitry moves up the neck seam along the neck portion of the virtual head representation, the processing circuitry may apply deformation to the neck portion of the virtual head representation.

With the deformed virtual head representation and the selected body type, the processing circuitry of network computing devices 18 may render the deformed virtual head representation with the selected body type by aligning the body type with the neck seam of the deformed virtual head representation to create the virtual representation of the user. For example, the processing circuitry may determine the vertices of the primitives that form the neck seam on the deformed virtual head representation and blend those vertices of the primitives that form the top of the body type to form a unitary structure that is the virtual representation of the user.

The processing circuitry may then output graphical information based on the virtual representation of the user to personal computing device 12. Personal computing device 12 may then display the virtual representation of the user. In some examples, the user, via personal computing device 12, may have selected a virtual apparel that he or she wants to try, and the processing circuitry may render the virtual apparel on top of the virtual representation of the user so that the user can see the style and fit of the apparel. In some examples, personal computing device 12 may be configured to separately receive the virtual representation and the virtual apparel, and personal computing device 12 may render the virtual apparel on the virtual representation.

In addition to apparel, the user may be also be able to select different accessories (e.g., hairstyles, earrings, sunglasses, etc.) and cosmetics (e.g., lipsticks, eye liners, etc.). For example, once a user creates his or her own virtual representation, the user can request to visualize a 3D accessory or cosmetics on the virtual representation. Given the user requests this in real-time basis, the processing circuitry of network computing devices 18 may need to deliver a virtual 3D model for the accessories and cosmetic products in real-time basis.

Moreover, the virtual 3D model of the accessories and cosmetic products should be sized and shaped to properly fit the virtual representation. In one or more examples, network computing devices 18 store the virtual 3D model of the accessories and the cosmetic products as they would appear on the virtual head representation, prior to any deformation. The processing circuitry may store information indicative of the deformation applied to the virtual head representation. The processing circuitry may determine the deformation to apply to the virtual 3D model of the accessories and cosmetic products based on the information indicative of the deformation applied to the virtual head representation so that the virtual 3D model of the accessories and cosmetic products scale with the deformations applied to the virtual head representation and the virtual 3D model of the accessories and cosmetic products aligns properly on the virtual representation of the user.

Figure 2:
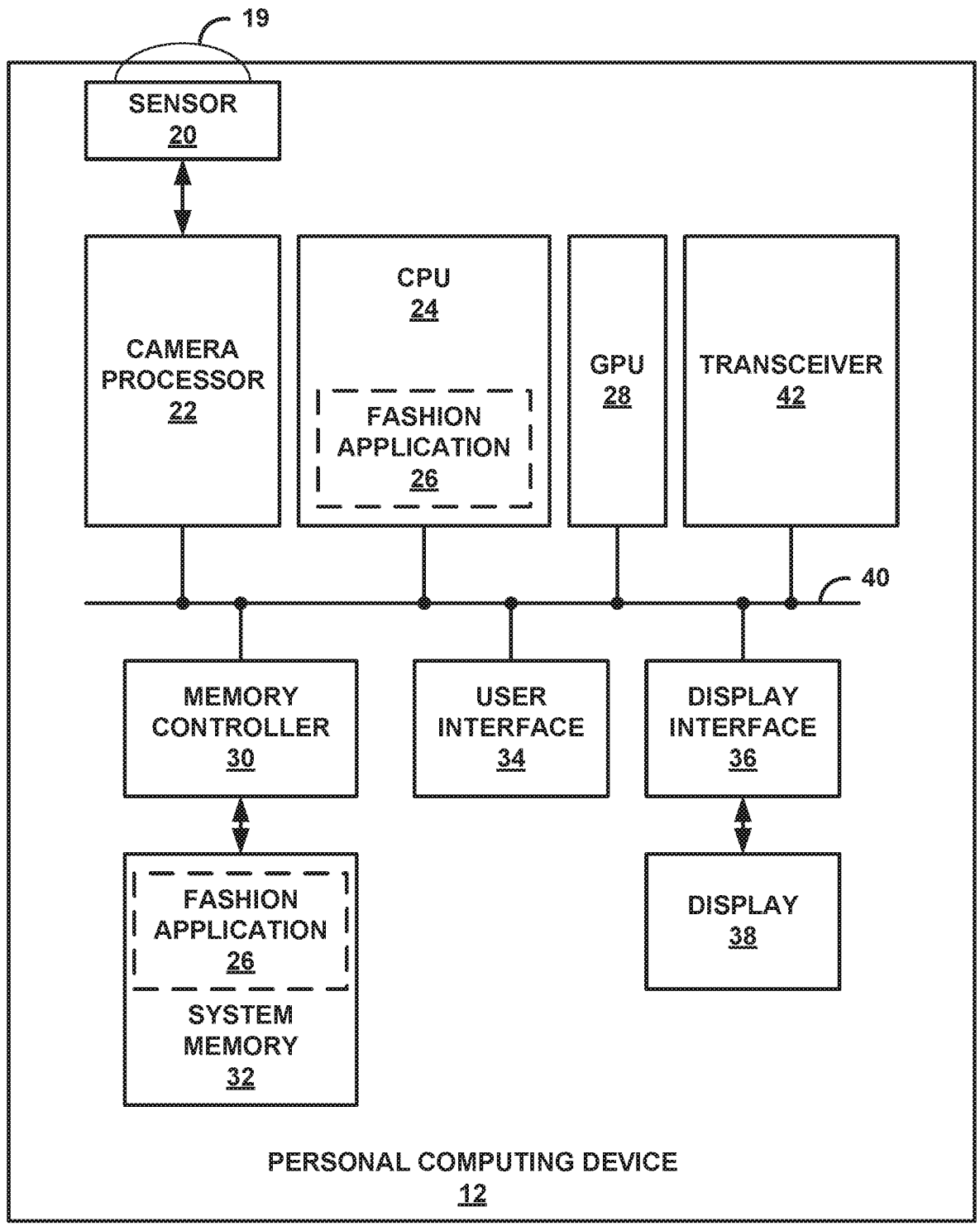
FIG. 2 is a block diagram illustrating an example of a personal computing device configured to display virtual representations of users in accordance with one or more example techniques described in this disclosure.

FIG. 2 is a block diagram illustrating an example of a personal computing device configured to display virtual representations of users in accordance with one or more example techniques described in this disclosure. Examples of personal computing device 12 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA). Additional examples of person computing device 12 include a personal music player, a video player, a display device, a camera, a television, or any other type of device that processes and/or displays graphical data.

As illustrated in the example of FIG. 2, personal computing device 12 includes lens 19 coupled to sensor 20, camera processor 22, a central processing unit (CPU) 24, a graphical processing unit (GPU) 28, memory controller 30 that provides access to system memory 32, user interface 34, and display interface 36 that outputs signals that cause graphical data to be displayed on display 38. Personal computing device 12 also includes transceiver 42, which may include wired or wireless communication links, to communicate with network 14 of FIG. 1. Although FIG. 2 illustrates lens 19 as part of the same device that includes GPU 28, the techniques described in this disclosure are not so limited. Moreover, the shape and configuration of lens 19 is illustrated as one example, and should not be considered limiting.

Also, although the various components are illustrated as separate components, in some examples the components may be combined to form a system on chip (SoC). As an example, camera processor 22, CPU 24, GPU 28, and display interface 36 may be formed on a common integrated circuit (IC) chip. In some examples, one or more of camera processor 22, CPU 24, GPU 28, and display interface 36 may be in separate IC chips. Various other permutations and combinations are possible, and the techniques should not be considered limited to the example illustrated in FIG. 2. The various components illustrated in FIG. 2 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry.

The various units illustrated in FIG. 2 communicate with each other using bus 40. Bus 40 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 2 is merely exemplary, and other configurations of computing devices and/or other image processing systems with the same or different components may be used to implement the techniques of this disclosure.

Camera processor 22 is configured to receive the electrical currents as sensor signals from respective pixels of sensor 20 and process the electrical currents to generate pixel data of images. In some examples, camera processor 14 may be configured as a single-input-multiple-data (SIMD) architecture. Camera processor 14 may perform the same operations on current received from each of the pixels on sensor 20. Each lane of the SIMD architecture may include an image pipeline. The image pipeline includes hardwire circuitry and/or programmable circuitry (e.g., at least one of fixed-function or programmable circuitry) to process the output of the pixels.

Camera processor 22 outputs the resulting images (e.g., pixel values for each of the image pixels) to system memory 32 via memory controller 30. As described in more detail, in response to a user executing fashion application 26, personal computing device 12 may upload the image to one or more network devices 18 for creating virtual representations of the user.

CPU 24 may be a general-purpose or a special-purpose processor that controls operation of personal computing device 12. A user may provide input to personal computing device 12 to cause CPU 24 to execute one or more software applications. The software applications that execute on CPU 24 may include, for example, fashion application 26, as described in more detail. The user may provide input to personal computing device 12 via one or more input devices (not shown) such as a keyboard, a mouse, a microphone, a touch pad or another input device that is coupled to personal computing device 12 via user interface 34. In some examples, such as where personal computing device 12 is a mobile device (e.g., smartphone or tablet), user interface 34 may be part of display 38.

Display 38 may include a monitor, a television, a projection device, a liquid crystal display (LCD), a plasma display panel, a light emitting diode (LED) array, electronic paper, a surface-conduction electron-emitted display (SED), a laser television display, a nanocrystal display or another type of display unit. Display 38 may be integrated within personal computing device 12. For instance, display 38 may be a screen of a mobile telephone handset or a tablet computer. Alternatively, display 38 may be a stand-alone device coupled to personal computing device 12 via a wired or wireless communications link. For instance, display 38 may be a computer monitor or flat panel display connected to a personal computer via a cable or wireless link.

Camera processor 22, CPU 24, and GPU 28 may store image data, and the like in respective buffers that are allocated within system memory 32. Display interface 36 may retrieve the data from system memory 32 and configure display 38 to display the image represented by the generated image data. In some examples, display interface 36 may include a digital-to-analog converter (DAC) that is configured to convert the digital values retrieved from system memory 32 into an analog signal consumable by display 38. In other examples, display interface 36 may pass the digital values directly to display 38 for processing.

For ease of description, one or more examples are described with user interface 34 being part of display 38 (e.g., where display 38 is a touchscreen). However, the example techniques should not be considered limited to such examples.

Memory controller 30 facilitates the transfer of data going into and out of system memory 32. For example, memory controller 30 may receive memory read and write commands, and service such commands with respect to memory 32 in order to provide memory services for the components in personal computing device 12. Memory controller 30 is communicatively coupled to system memory 32. Although memory controller 30 is illustrated in the example of personal computing device 12 of FIG. 2 as being a processing circuit that is separate from both CPU 28 and system memory 32, in other examples, some or all of the functionality of memory controller 30 may be implemented on one or both of CPU 24 and system memory 32.

System memory 32 may store program modules and/or instructions and/or data that are accessible by camera processor 22, CPU 24, and GPU 28. For example, system memory 32 may store user applications (e.g., fashion application 26), resulting images from camera processor 22, rendered image content from GPU 28, etc. System memory 32 may additionally store information for use by and/or generated by other components of personal computing device 12. System memory 32 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 32 may include instructions that cause camera processor 22, CPU 24, GPU 28, and display interface 36 to perform the functions ascribed to these components in this disclosure. Accordingly, system memory 32 may be a computer-readable data storage medium having instructions stored thereon that, when executed, cause one or more processors (e.g., camera processor 22, CPU 24, GPU 28, and display interface 36) to perform various functions.

In some examples, system memory 32 is a non-transitory storage medium. The term "non-transitory" indicates that the storage medium is not embodied in a carrier wave or a propagated signal. However, the term "non-transitory" should not be interpreted to mean that system memory 32 is non-movable or that its contents are static. As one example, system memory 32 may be removed from personal computing device 12, and moved to another device. As another example, memory, substantially similar to system memory 32, may be inserted into personal computing device 12. In certain examples, a non-transitory storage medium may store data that can, over time, change (e.g., in RAM).

As illustrated, one example of the software application that CPU 24 executes is fashion application 26. The user may see a thumbnail indication of fashion application 26 on display 38, and when the user wants to interact with fashion application 26 (e.g., such as when the user wants to determine fit and style of apparel or accessories), the user touches the thumbnail to execute fashion application 26 on CPU 24.

In response to executing fashion application 26, the user may be prompted, via display 38, to take an image of himself or herself (e.g., a selfie). The user may then take the selfie, ensuring that his or her face is visible. For instance, in response to interacting with the prompts provided on display 38, lens 19 and sensor 20 capture a selfie of the user that camera processor 22 process and display 38 displays within the graphical interface generated by the execution of fashion application 26. Rather than or in addition to taking a selfie, display 38, responsive to the execution of fashion application 26, may instruct the user to retrieve a pre-stored selfie from system memory 32.

In some examples, display 28, responsive to the execution of fashion application 26, may prompt the user to input body type information such as one or more of waist, height, bust, hips, weight, body shape, and the like. The waist, height, bust, and body shape are examples of body type parameters, and there may be additional examples of body type parameters. In some examples, in addition to or instead of inputting body type information, the user may take additional selfies that capture the full body of the user, from which body type information may be determined.

In some examples, display 28 may display a base body, and the user changes measurements of any portion of the body (e.g., shoulder, chest, abdomen, waist, hips, thighs, arms, torso-bottom, etc.) to create a more accurate representation of his or her body shape. Such user body measurement input may be in the form of visual fine-tuning. Display 28 may display a slide scale to allow the user to input changes, possibly with no number input required. The changes could be done in up or down steps to help user arrive at the right body shape as per his or her visual sign-off.

CPU 24, via execution of fashion application 26, may cause transceiver 42 to output the image (e.g., selfie image) and the user inputted body type information and/or the body image to one or more network computing devices 18 for network computing devices 18 to create a virtual representation of the user, in accordance with one or more example techniques described in this disclosure. In addition, fashion application 26 may allow the user to select, via display 38, apparels and accessories that the user may want to virtually try-on to see the style and fit. CPU 24, via execution of fashion application 26, may cause transceiver 42 to also output information of the apparels and accessories.

One or more network computing devices 18 may create the virtual representation of the user using the example techniques described in this disclosure and output graphical information of the virtual representation to personal computing device 12. As one example, network computing devices 18 may generate a series of commands and data (e.g., vertices and color information) for how GPU 28 is to render the virtual representation, and output the commands and data, which are examples of the graphical information, to personal computing device 12.

In some examples, the commands may conform to a graphics application programming interface (API), such as, e.g., an Open Graphics Library (OpenGL®) API, OpenGL® 3.3, an Open Graphics Library Embedded Systems (OpenGL ES) API, an OpenCL API, a SceneKit API, a MetalKit API, a Vulkan API, a Direct3D API, an X3D API, a RenderMan API, a WebGL API, or any other public or proprietary standard graphics API. The techniques should not be considered limited to requiring a particular API.

GPU 28 receives (e.g., directly from transceiver 42 or from CPU 24) the commands and data generated by network computing devices 18. In response, GPU 28 performs the operations defined by the commands on the received data to render the virtual representation of the user, possibly with the virtual apparel and accessories visible to the user. GPU 28 stores the graphical data as the result of the rendering in system memory 32, and display interface 36 retrieves the graphical data for display on display 38.

In some examples, the user requests movement or some form of animation of the virtual representation from the interface provided by fashion application 26. In response, CPU 24, via fashion application 26, may request network computing devices 18 to render frames having the different movement (e.g., generate frames at 30 frames-per-second (fps)), and display 38 may display the frames at the frame rate to show smooth movement. In some examples, GPU 28 renders frames at 30 fps to animate the movement and cause display 38 to display the animation.

Moreover, display 38, via execution of fashion application 26, displays options for the user to request new apparel or accessories. In response, CPU 24, via execution of fashion application 26, causes transceiver 42 to output information of the requested apparel or accessories. Transceiver 42 receives graphical information for the newly requested apparel or accessories, and GPU 28 renders the virtual representation with the newly requested apparel or accessories.

In this way, the example techniques describe an immersive experience for the user to determine the style and fit of an apparel or accessory without needing to physically try it on. As described, the user may desire to view the apparel and accessory on the virtual representation in run-time (e.g., real-time) so that the user can quickly determine whether to try on different apparel or accessories. Accordingly, network computing devices 18 may be configured to generate the graphical information in run-time so that personal computing device 12 can display the virtual representation and apparel and accessories in run-time.

For example, via the execution of fashion application, the user may be able to perform various tasks to determine the style and fit. Accordingly, this disclosure describes techniques to provide consumers an immersive end to end personalized 3D experience for fashion discovery and commerce on mobile. The immersive personalized 3D experience may start with the consumer or user creating a realistic 3D avatar of themselves in a few seconds with a simple 2D selfie, four core measurements, height, waist, bust, and hip, and then fine-tuning the body shape visually by altering the proportions of various body parts.

During execution of fashion application 26, the user is provided guidance and cues to get the selfie right and a realistic avatar (e.g., virtual representation). The avatar created by the user can be edited to further customize and personalize. With the 3D avatar created, the user can then use a marketplace (e.g., as provided by execution of fashion application 26) to find apparel, accessories, beauty and personal care products from different vendors and add them to the virtual fitting room for look and fit evaluation. Users, via fashion application 26, can also search for related items based on an existing image of an apparel or a picture taken of the apparel. The closest match found can be added to the fitting room for look and fit evaluation.

The user can then evaluate and compare the apparel in a virtual fitting room, displayed via execution of fashion application 26, for look and fit by just toggling apparel in available in the virtual fitting room and experience a full makeover with accessories, beauty and personal care products. Users can also place themselves in different environment settings like a town square to get a realistic sense of look and fit. Users can share their avatars with the full makeover with their friends and family for comments and feedback and complete their purchase with the shopping cart.

Figure 3:
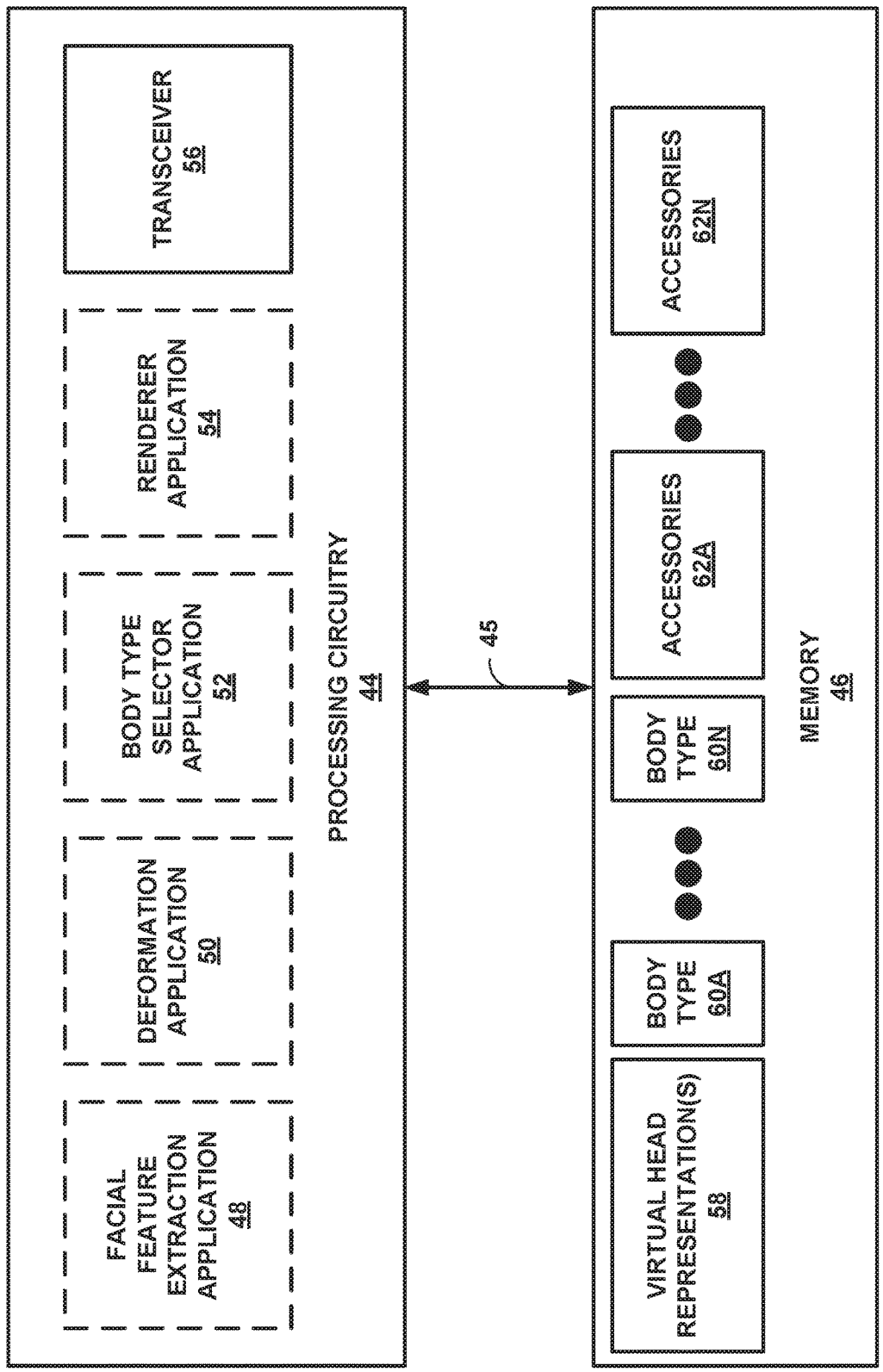
FIG. 3 is a block diagram illustrating an example of processing circuitry configured to render virtual representations of users in accordance with one or more example techniques described in this disclosure.

FIG. 3 is a block diagram illustrating an example of processing circuitry configured to render virtual representations of users in accordance with one or more example techniques described in this disclosure. FIG. 3 illustrates processing circuit 44 and memory 46. Processing circuitry 44 and memory 46 may be distributed across one or more network computing devices 18 within cloud 16. For example, as described above, cloud 16 provides a computing infrastructure where operations are distributed across network computing devices 18. Accordingly, FIG. 3 may be considered as illustrating one or more network computing devices 18 that include processing circuitry 44 and memory 46.

For example, processing circuitry 44 is illustrated as executing facial feature extraction application 48, deformation application 50, body type selector application 52, and renderer application 54. Transceiver 56 is circuitry with which processing circuitry 44 receives and transmits information. Also, memory 46 is illustrated as storing one or more virtual head representations 58, body types 60A-60N (collectively "body types 60"), and accessories 62A-62N (collectively "accessories 62"). However, it may be possible, based on control of cloud 16 or workload of network computing devices 18 that one or more of the applications shown as executing on processing circuitry 44 execute on different network computing devices 18. Also, it may be possible that different network computing devices 18 each store some of the information shown to be stored in memory 46. For example, one network computing device 18 stores a subset of body types 60, another one of network computing device 18 stores another subset of body types 60, and so forth. The same may be true for accessories 62.

The example of FIG. 3 captures these various examples where processing circuitry 44 and memory 46 are distributed among one or more network computing devices 18. As illustrated, processing circuitry 44 and memory 46 communicate via communication channel 45. Communication channel 45 may be a bus, similar to bus 40 of FIG. 1. In some examples, communication channel 45 may be a packet-based network, such as a local area network, a wide-area network, or a global network such as the Internet.

Processing circuitry 44 may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Also, memory 46 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

Although the example of FIG. 3 shows applications executing on processing circuitry 44, the example techniques are not limited. In general, processing circuitry 44 may be configured to perform one or more example techniques described in this disclosure via fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Processing circuitry 44 may include arithmetic logic units (ALUs), elementary function units (EFUs), digital circuits, analog circuits, and/or programmable cores, formed from programmable circuits. In examples where the operations of processing circuitry 44 are performed using software executed by the programmable circuits, memory 46 may store the object code of the software that processing circuitry 44 receives and executes. For example, memory 46 may store the object code for facial feature extraction application 48, deformation application 50, body type selector application 52, and renderer application 54 that processing circuitry 44 retrieves and executes.

Also, facial feature extraction application 48, deformation application 50, body type selector application 52, and renderer application 54 are illustrated as separate simply to ease with understanding. Facial feature extraction application 48, deformation application 50, body type selector application 52, and renderer application 54 may be structured as software functions that are called by high-level application executing on processing circuitry 44. In some examples, facial feature extraction application 48, deformation application 50, body type selector application 52, and renderer application 54 may be integrated into a common application that processing circuitry 44 executes.

Processing circuitry 44 receives an image that includes the face of the user and body measurements. Facial feature extraction application 48 may be configured to determine key facial points of reference such as face outline, eyes, nose, lips, cheek-bone, and jaw-line. Facial feature extraction application 48 may utilize example facial feature extraction techniques such as those available from Facegen Software Development Kit from Singular Inversions. Moreover, further modifications to existing algorithms may be possible such as deep convoluted neural networks to recognize key facial points. For instance, some existing techniques may require straight angle and neutral expression for determining key facial points. With neural networks, and artificial intelligence, it may be possible to feed as input different selfies that are not at straight angles and not neutral expression, and provide input to the neural networks of the key facial points. The neural networks may then be configured to determine facial points even in examples where the selfie is not perfectly aligned and the user provided the image with facial expressions.

The output of facial feature extraction application 48 may be a data file that identifies facial outline from the image and includes information to extract out the front face portion for further processing. Also, the key facial features are used to extract out various parts of the face (lips, nose, cheeks, eyebrows, etc.), which can then later be applied to the deformed user face.

In some examples, facial feature extraction application 48 may determine average skin complexion of the user. For example, facial feature extraction application 48 may determine the red-green-blue (RGB) values of the pixels that form the face and perform an averaging algorithm to determine average skin complexion. Facial feature extraction application 48 may use the average skin complexion to back calculate the impact of lighting conditions on the user face with respect to their average skin complexion and determine approximate relative distances of various points on the face.

The following is an example technique to approximate relative distances of various points on the face. The facial feature points help identify the face region from the input user face selfie (e.g., image of the user). They also help identify the non-skin regions like eyes, eye-brows, and lips. The skin portion is separately extracted out of the face region of the input user face selfie using these facial feature points. Once done, the RGB (red-green-blue) color variance is calculated against a mean RGB and all statistically significant outliers are discarded to remove any residual non-skin portions like moles, scars, etc. This helps find all the pixels from the user selfie that represent the user skin. These pixels are then used to calculate the mean RGB color for the user skin. The last two rows of the head above the defined neck seam are applied this constant mean RGB color across all texels. The body is also given this constant mean RGB color which helps consistent color smoothing at the neck seam.

Based on the approximate relative distances, facial feature extraction application 48 determines the 3D facial shape and contours as estimates of the face shape and contour of the user. The 3D facial shape and contours, as well as average skin complexion, key facial features points, and the like are examples of facial features extracted from the image. Facial feature extraction application 48 may store information of the facial features extracted from the image in memory 46 or local memory of processing circuitry 44.

In some examples, facial feature extraction application 48 or possibly some other application executing on processing circuitry 44 may be configured to select one of virtual head representations 58. For instance, based on the extracted facial features, processing circuitry 44 may determine which one of virtual head representations 58 most closely matches the head of the user. As one example, processing circuitry 44 may determine the facial features of virtual head representations 58 and select the virtual head representation 58 that most closely matches the facial features determined by facial feature extraction application 48.

Each of the virtual head representations 58 may be associated with a set of body types 60. As described in more detail below, body type selector application 52 may select one of the body types 60. One feature of the body types 60 associated with respective virtual head representations 58 is that the neck seam of the body types and the virtual head representations substantially align. Body type selector application 52 may select one of the body types 60 associated with the selected virtual head representation 58 of the virtual head representations 58.

In some examples, there may be only one virtual head representation 58. The example techniques described in this disclosure are applicable to examples where there are a plurality of virtual head representations 58 from which one is selected, and examples where there is one example of virtual head representation 58.

Deformation application 50 retrieves the facial features and retrieves virtual head representation 58 on which to apply deformations based on the facial features. For example, virtual head representation 58 may be information of a 3D mesh of primitives (e.g., triangles, but other shapes are possible) that form a shape of the human head. The information of the 3D mesh of primitives may include vertex coordinates for the vertices in the 3D mesh, and information that indicates how the vertices are connected together. Virtual head representation 58 may be considered as a default deformable 3D face model.

Based on the facial features (e.g., face shape and contour), deformation application 50 may determine the deformations needed to apply to virtual head representation 58 and store information indicative of the deformations needed to apply (e.g., in the local memory or memory 46). The deformations needed to apply to virtual head representation 58 may be a series of equations that indicate how the vertices of the 3D mesh of primitives are to shift. For example, if the user has a longer head, deformation application 50 may determine how to stretch out the primitives of virtual head representation 58 to form the head. If the user has a thicker head, deformation application 50 may determine how to expand out the primitives of virtual head representation 58, and so forth.

To perform such shifting, virtual head representation 58 may include a head portion and a neck portion, with the neck portion ending with a neck seam, and the 3D mesh may include vertices of primitives for the head and neck portion and the neck seam. As described in more detail, deformation application 50 may determine deformations to apply to virtual head representation 58, such as deformations to apply to the head and neck portion. However, deformation application 50 may not determine (or at least not apply) deformations to the neck seam to ensure that the neck seam lines up with the body. In some examples, deformation application 50 may determine some deformations along the neck moving up from the neck seam (e.g., no deformations at the neck seam, and gradual deformations up the neck portion).

Deformation application 50 may apply the deformations determined based on the facial features to virtual head representation 58 to create a user face shape. Deformation application 50 may apply (e.g., via texture mapping) the skin color and texture for various parts of the face, as extracted via facial extraction application 58, to the deformed virtual head representation to create a near-real 3D face model of the user. In some examples, renderer application 54 renders (e.g., draws) the deformed virtual head representation with the colors and textures, and stores the result standard 3D object formats such as .obj, .ply, .stl, .glts, .fbx, etc. depending on the rendering environment requirements (e.g., based on the rendering capabilities of personal computing device 12).

Body type selector application 52 receives body type information of the user. For example, as described above, the user may input body type information such as height, waist, bust/chest, hip, and/or weight measurements, and/or visual body type selection (e.g., apple, pear, rectangle, etc.). These measurements may be adequate from a fit perspective for standard machine-manufactured apparel as they are designed on similar body types. In some examples, body type selector application 52 may determine these measurements from full body pictures, which can avoid the user having to enter measurements. As users are likely to wear different sizes of apparel in different pictures (e.g., loose fitting or tight fitting), body type selector application 52 may utilize multiple pictures to determine an accurate estimation of the body type.

Based on the body type information, body type selector application 52 determines a body type from body types 60. For example, body types 60 are a database of pre-modelled 3D body avatars (without face or neck). Body type selector application 52 may identify the nearest match to body types 60 by matching measurements and anthropometric ratios provided by the user with measurements and anthropometric ratios of the pre-modelled 3D body avatars.

As one example, body type selector application 52 uses a k-nearest neighbors based classification to determine one of body types 60 based on the input measurements (e.g., body type information). For example, body type selector application 52 may first determine which ones of body types 60 have the same or the closest parameter as a first parameter of the body type information (e.g., which ones of body types 60 have the same height parameter as the height parameter of the user provided body type information). Based on the determination, body type selector application 52 may reduce the number of body types 60 to evaluate substantially down to a first subset of body types 60. Next, body type selector application 52 may determine which ones of the first subset of body types 60 have the same or the closest parameter as a second parameter of the body type information (e.g., which ones of body types 60 have the same waist parameter as the waist parameter of the user provided body type information). Based on the determination, body type selector application 52 may reduce the number of body types 60 to evaluate even further down from the first subset of body types 60 to a smaller, second subset of body types 60. Body type selector application 52 may repeat these operations until there is one remaining one of body types 60.

In some examples, after reducing subsets of body types 60 until there are N-number of body types 60 remaining, body type selector application 52 may determine a Euclidean distance to determine the "closest" one of the remaining body types 60. For instance, each body type parameter may be considered as coordinates of a Euclidean point, and body type selector application 52 may determine Euclidean distances with each of body types 60.

For example, assume that the user input body type information includes four parameters (user P1, user P2, user P3, and user P4). In this example, to determine Euclidean distance with body type 60A, body type selector application 52 may determine the difference between each of the four parameters and their respective parameters of body type 60A. Body type selector application 52 may square the differences, sum the results, and determine the square root to determine the distance. For example, body type selector application 52 may determine: sqrt((user P1−body type 60A P1)$^2$+(user P2−body type 60A P2)$^2$+(user P3−body type 60A P3)$^2$+(user P4−body type 60A P4)$^2$) equals the distance to body type 60A. In some examples, to assign more value to a particular parameter (e.g., feature), body type selector application 52 may determine weighted distances which bias the result towards the dominant parameter (e.g., body type selector application 52 may select a body type 60 which fits better on the user from waist point of view than height point of view). Based on the distances, body type selector application 52 may determine which one of body types 60 is the closest match to the body type of the user.

After selecting the body type, renderer application 54 may render the deformed virtual head representation with a body type (e.g., as selected by body type selector application 52) based on aligning the body type with a neck seam of the deformed virtual head representation to create a virtual representation of the user. In one or more examples, each one of body types 60 may be constructed such that where the neck is to attach on body types 60 substantially aligns with the neck seam of virtual head representation 58. As described above, deformation application 50 may not perform (or perform minimal) deformations on the neck seam of virtual head representation 58 (e.g., selected one of the virtual head representations). Therefore, after deformation, the neck seam of the deformed virtual head representation should substantially align any one of body types 60. Accordingly, the neck seam of the deformed virtual head representation, as generated by deformation application 50, should substantially align the selected one of body types 60, as selected by body type selector application 52. By keeping the neck seam rigid during deformations (e.g., not deforming the neck seam), the deformed virtual head representation align spatially with the neck seam of body types 60 (e.g., top of body types 60).

To render the deformed facial contour and the selected body type, renderer application 54 may blend vertices that form the neck seam with vertices at the top of mesh that forms that selected body type. The result of the blending may be a continuous structure that looks like the face and body type of the user (e.g., the result of the rendering is a body that looks like the user). Renderer application 54 may utilize the average skin color to color in the body, head, and neck of the user so that the result of the rendered head and body is aligned spatially, as well as color and texture wise. Renderer application 54 may generate the result, for export (e.g., outputting), in any of the standard 3D object formats (e.g., .obj, .ply, .stl, .fbx., .glts, etc.).

In this way, processing circuitry 44 is an example processing circuitry configured to receive an image (e.g., via transceiver 56) of a user and deform virtual head representation 58 based on facial features of the image. As described, virtual head representation 58 includes a head portion and a neck seam, and processing circuitry 44 may deform the head portion, but avoid deforming (e.g., bypass deforming) the neck seam.

Processing circuitry 44 may render the deformed virtual head representation with a body type of body types 60 based on aligning the body type with a neck seam of the deformed virtual head representation to create a virtual representation of the user. Processing circuitry 44 may then output (e.g., via transceiver 56) graphical information based on the virtual representation of the user. Examples of the graphical information includes the 3D object formats such as in .obj, .ply, .stl, .fbx., .glts, etc.

As described in more detail, any hairstyle can then be applied to customize the 3D user avatars (e.g., virtual representation) as per user preferences. Apparel and body accessories can be pre-simulated using the default body database and kept ready for real-time rendering, minimizing the need of any spatially morphing and thereby reducing the computational time required to deliver user requests. Face accessories can be designed for default deformable 3D face (e.g., virtual head representation 58) and customized for user generated 3D faces by applying the stored deformations.

In one or more examples, processing circuitry 44 (e.g., via body type selector application 52 or some other application) may be configured to maintain which body types 60 are stored in memory 46. Processing circuitry 44 dynamically maintains with flexibility of adding or removing pre-modelled body types 60 based on insights from user body clusters identified from real user measurements. As a starting point, various body surveys, such national body surveys from various countries including the United States and Britain, offers a good starting point to design a comprehensive set of proprietary pre-modelled 3D bodies (e.g., body types 60).

As more and more users interact with processing circuitry 44, user measurement clusters can be used to implement machine learning algorithms that keep fine-tuning the database of body types 60 based on data insights and improving the efficacy of the closets-fit algorithms (e.g., shortest Euclidean distance). For instance, the user provided measurements, from all the different users and possibly also from the national body surveys, are used as a starting point to generate initial set of body measurements. Processing circuitry 44 may use unsupervised machine learning techniques to generate representative subset of this given input set. For instance, processing circuitry may apply a k-means clustering on the input measurements. The point of clustering is to create groups of data points which are like each other within each cluster and differ from points in other clusters.

Processing circuitry 44 may use body measurements like chest, waist, hips, height, etc. and the ethnicity of the user as features vectors in distance calculations. For example, for size of small, medium, large, extra large, double extra large, processing circuitry 44 may generate clusters across weight, ethnicity, etc.

Over a period of time, processing circuitry 44 (e.g., via artificial intelligence (AI)) engine) calculates the difference between user measurements and the body types 60 assigned to those inputs to determine the error associated with each user request. Processing circuitry 44 may compare this delta with a pre-determined maximum delta. This maximum delta may be the value at which the user cannot determine difference between his or her actual measurements and those on the created virtual representation (e.g., avatar). If the rendered virtual representation delta is more than the pre-determined maximum delta, processing circuitry 44 may make an entry in a database related to this requested user measurements, the selected body type 60, and the delta in the measurements. Processing circuitry 44 may trigger a recalibration of the body set (e.g., of body types 60) to get new representative body types 60. For this, processing circuitry 44 may re-run the k-means clustering to get k new cluster centers.

Processing circuitry 44 may further determine the correct value for k. For example, processing circuitry 44 may run iterations for decreasing values of k and calculate if decreasing the number of clusters reduces the error in the centroid representative body measurements with the actual user inputs of that cluster. This can be used to decrease the simulation body set size, saving resources.

In some examples, for the standard sizes (e.g., small, medium, large, extra large, etc.), an administrator may evaluate virtual apparels having these standard sizes on the virtual body types (e.g., body types 60) that correspond to these standard sizes. Once the administrator is done evaluating the virtual apparels, processing circuitry 44 may be configured to morph the virtual apparel for each of the body types 60. For example, processing circuitry 44 (e.g., via a body type generation application or some other application) may determine a new body type that should be added to body types 60 based on body type information that has been received over time from different users. From this information, processing circuitry 44 may determine that new body type is needed because the current set of body types 60 is insufficient as a proper estimate of many of the users. To create the new body type, processing circuitry 44 may modify one of the base body types 60 (e.g., a body type that corresponds to standard apparel sizes) such as by deforming the body type. Based on the deformations needed to deform the base body type to generate the new body type, processing circuitry 44 may similarly deform the apparel corresponding to the base body type. In this way, processing circuitry 44 may be configured to generate, very quickly, and with very little human input or testing, many different body types 60 and the virtual apparel for those body types 60 to service a wide range of people with different body types.

Moreover, in some examples, processing circuitry 44 may be configured to construct body types 60 that are more relevant for different geographic locations or other characteristics that may be common across groups of peoples. For example, once processing circuitry 44 has received a substantial number of user inputs (e.g., user provide body type information), processing circuitry 44 may perform a combination of polynomial regression and step function on that data set and determine results to make the set of bodies more relevant to the user population. Processing circuitry 44 may determine the ranges where more bodies need to be added in the set of body types 60 to get higher accuracies for user inputs as well as identify the bodies in the set which are not being served to the users on a broader scale or are the outliers to discard.

One example way in which to polynomial regression and step function is as follows. There may be k-mean clusters for each of the user input—height, waist, bust and hips. The following describes the example techniques with respect to height, but the example techniques are applicable to the waist, bust, and hips as well.

As one example, height category includes 5 k-mean clusters based on user inputs. Processing circuitry 44 may perform linear regression to the mean for each of those clusters and work towards evening out the anomalies/outliers that were existing in the dataset created upfront. From each mean value, processing circuitry 44 may extend three standard deviations to reach 99.7% accuracy for the predicted dataset. This process results in five different linear regression models in steps of increasing value from the least measurement to the highest. These linear regressions will eventually be combined to form a polynomial regression.

The dataset generated from each input category regression analysis will then be used to form combinations with the same analysis of other input parameters to create the framework for body creation and/or validation of existing dataset. Using the above example techniques, the user creates a virtual representation in real-time because the morphing of the head is separated from body type selection allowing for not only parallel processing, but reduction in deformations because the body type is selected. With the virtual representation, the user may be able to try on different apparels. For instance, virtual representations of the apparel may have been previously created and rendered with body types 60. In one or more examples, the rendering performed by renderer application 54 includes rendering a selected apparel on top of the selected one of body types 60. For example, the user may be shown different apparel options. The user selects which apparel to "wear" and renderer application 54 renders the apparel on the virtual representation. In such examples, the graphical information based on the virtual representation of the user that processing circuitry 44 outputs includes the graphical information of the apparel on top of the virtual representation.

In some examples, memory 46 may pre-store the virtual representation of the apparel on body types 60. In such examples, body type selector application 52 may select the body type based on body types 60 and the body type information. However, renderer application 54 may render the selected body type, with the user selected apparel on the body type, with the deformed virtual head representation aligned at the neck seam to create the virtual representation. Accordingly, the examples for rendering to create a virtual representation include examples where the virtual representation includes the apparel and examples where the virtual representation does not include the apparel. Also, examples of outputting graphical information include examples where processing circuitry 44 outputs graphical information of the virtual representation and examples where processing circuitry 44 outputs graphical information of the virtual representation having the selected apparel on the virtual representation.

Furthermore, in some examples, the user may desire to determine the fit and style of various accessories such as different hair styles, earring, etc. In some examples, processing circuitry 44 may be configured, via renderer application 54, to render accessories on the virtual representation of the user. For example, once a user creates his or her own virtual representation, the user can request to visualize a 3D accessory (e.g., hairstyles, sunglasses, specs, earrings etc.) or a cosmetic product (e.g., lipstick, eye liners, pops, etc.) on their own virtual representation. However, rendering the user requests in real-time may require optimization to allow processing circuitry 44 to render the virtual representation with the accessories. In this disclosure, cosmetics can be considered as an example of an accessory.

In one or more examples, deformation application 50, or possibly another application, may be configured to apply deformations to pre-modeled virtual representations of accessories, stored as accessories 62. The deformations may be such as to morph the accessory so that the morphed accessory has the right fit for the user.

Accessories 62 are examples of accessories and cosmetic products that are pre-registered in spatial alignment with virtual head representation 58. For example, accessories 62 are pre-modeled so that accessories 62 fit on virtual head representation 58 before any deformations. For example, processing circuitry 44 or some other computing device registers (e.g., identifies as corresponding) vertices of the 3D accessory or cosmetic product with respect to vertices on virtual head representation 58 (e.g., by spatially registering the 3D surface of the accessory or cosmetic product with respect to the 3D surface of virtual head representation 58). As illustrated, memory 46 stores the detailed propriety models as accessories 62 with all the information.

As described above, deformation application 50 determines and stores information indicative of the deformations that are to be applied to virtual head representation 58. In some examples, deformation application 50 utilizes this stored information indicative of the deformations to determine how to morph (e.g., deform) accessories 62 to determine the style and fit of the accessory on the user. Deformation application 50 may then deform the selected ones of accessories 62. In this manner, computational resources are not wasted recomputing how to deform accessories 62. Rather, deformations determined for deforming virtual head representation 58 can be reused to deform accessories 62 to ensure that accessories 62 are spatially aligned with the virtual representation of the user.

Accordingly, in one or more examples, processing circuitry 44, via deformation application 50, may determine deformations to apply to virtual head representation 58 based on the facial features in the image, and apply the deformations based on the determined deformations. Processing circuitry 44 may retrieve a model of an accessory or cosmetic product (e.g., one of accessories 62) based on user selection. In some examples, the model of the selected one of accessories 62 is pre-registered in spatial alignment with virtual head representation 58. Because accessories 62 are pre-registered in spatial alignment with virtual head representation 58, deformation application 50 may be able to apply deformations determined as part of deforming virtual head representation 58 to deform the selected one of accessories 62.

Renderer application 54 may render the deformed model of the selected one of accessories 62 on the virtual representation. For example, renderer application 54 may output graphical information of the deformed model of the accessory or cosmetic product (e.g., as a 3D object). In this manner, the output from processing circuitry 44 may be graphical information of the virtual representation of the user along with the chosen apparel and chosen accessories. Personal computing device 12 receives the output from processing circuitry 44 and GPU 28 renders the virtual representation with the apparel and accessories on display 38 for the user to determine the style and fit. In some examples, processing circuitry 44 may separately output graphical information of the virtual representation and the virtual representation of the apparel and/or accessories. In such examples, GPU 28 may render the virtual representation, the virtual apparel, and/or the virtual accessories and stitch them together. In this disclosure, processing circuitry 44 outputting graphical information includes examples where processing circuitry 44 renders the virtual representation, virtual apparel, and virtual accessories together, and outputs the resulting graphical information, or outputs the graphical information for one or more of the virtual representation, virtual apparel, and virtual accessories, separately.

The above example techniques may be utilized to generate a static low-polygon 3D virtual representation, which is efficient to use for style and fit evaluation of apparel and accessories. Having such a static low-polygon 3D virtual representation may be beneficial because it reduces the amount of time needed to render on personal computing device 12, as well reduce the time needed for generation on processing circuitry 44. Accordingly, in some examples, the static low-polygon 3D virtual representations may be created relatively fast in cloud 16 and then rendered quickly on personal computing device 12.

However, in some examples, there may be benefits of creating non-static virtual representations (e.g., virtual representations that can move and be animated). Processing circuitry 44 may be configured to generate "pre-rigged" high-polygon 3D virtual representations for various reasons such as advertising products, product recommendations, and virtual reality (VR) headset based experiences. The promotional videos may be created after putting the virtual representation in any 3D environment with any apparel or accessory combination and applying a motion capture animation sequence. The animation may be sequenced in true life-size 3D and dynamic motion-based videos can be created using camera views in the true life-size 3D environment. The animations may also be exported as 360-degree videos for viewing via a virtual reality headset to experience a life-size immersive experience.

Pre-rigged high-polygon 3D virtual representations may be similar to the static low-polygon 3D virtual representations; however, virtual head representation 58 and body types 60 may be "pre-rigged." Pre-rigged means that in addition to the shape, virtual head representation 58 and body types 60 include skeletal and muscular information. For example, the vertices of virtual head representation 58 and body types 60 are registered to (e.g., correspond to) skeletal and muscular points. The skeletal and muscular points may be define flex points along with virtual head representation 58 and body types 60 can shift or bend.

The virtual representation generated accordingly has all rigged information (skeleton, muscle, and facial morph) and can then be animated programmatically using motion capture sequences. The virtual representation can be placed in any 3D environment with apparel and accessories and then animated videos can be created using associated motion capture sequences of the virtual representation.

For example, renderer application 54 may be configured to apply a relevant motion sequence selected by the user onto the rigged virtual representation. The motion sequence is checked (e.g., manually upfront once at time of selection of motion sequence) for any inconsistency or body parts clashing issues to have a seamless motion of the virtual representation. Once there is a pass through the boundary conditions as laid out for all the bodies together, the motion sequence can be applied onto any rigged body from the dataset in run time. The motion sequence applied on the virtual representation is used to create cloth physics motion by simulating the motion of the cloth along the with the user motion. In this way, realistic cloth simulation is created and exported for each type of motion sequence selected by the user.

Simultaneously, the simulation for hair and other body accessories including shoes is recorded for the selection motion sequence. A developer may determine a 3D environment as suitable for animation adding in all relevant files including the scene elements and props along with the virtual representation, apparels, and accessories. In such examples, the developer may separately program and develop the environment and select the particular animation to apply, and then leverage the virtual representation having the apparels and accessories, as created using the example techniques described in this disclosure to generate the motion sequence. Renderer application 54 may render the final video of the animation sequence and output the video as a 2D video format or in a 360-degree 3D video format.

Figure 4:
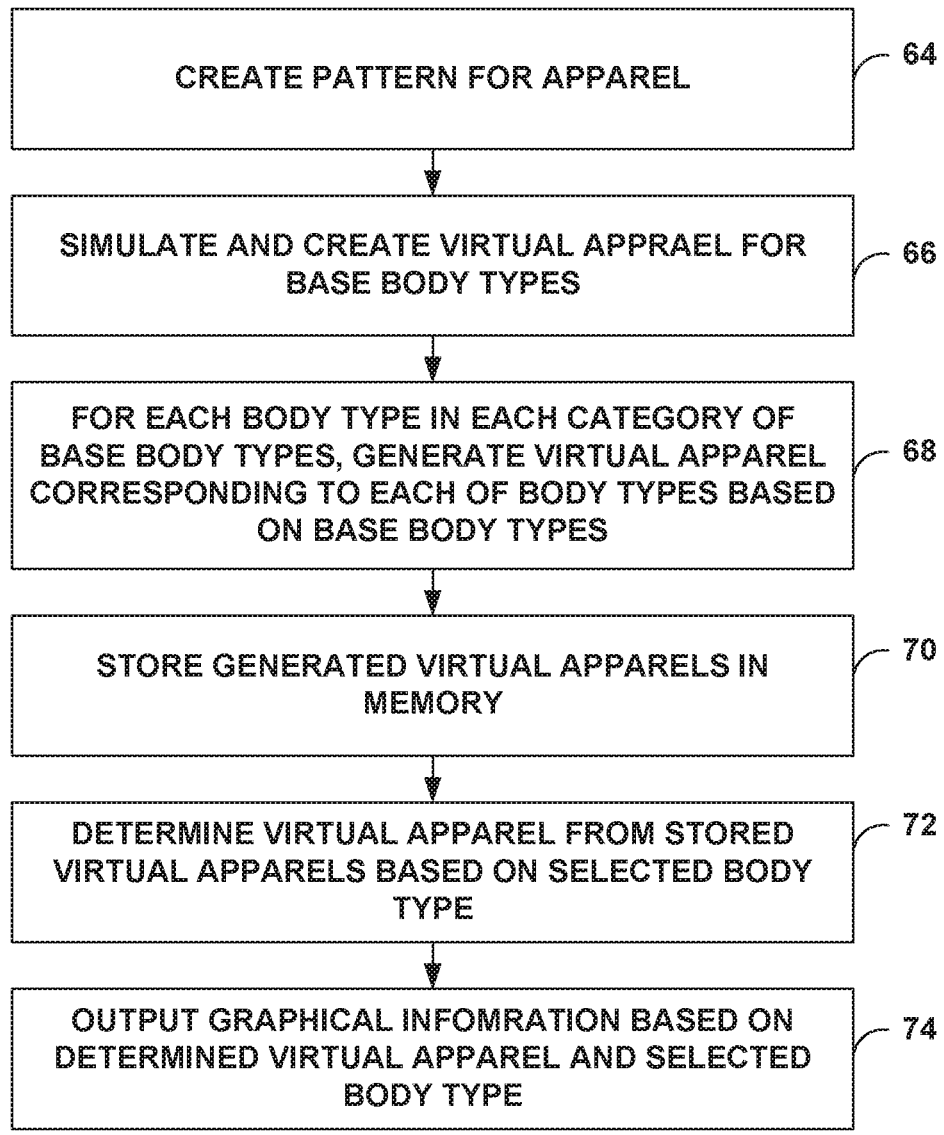
FIG. 4 is a flowchart illustrating an example method of generating and outputting virtual apparels in accordance with one or more example techniques described in this disclosure.

FIG. 4 is a flowchart illustrating an example method of generating and outputting virtual apparels in accordance with one or more example techniques described in this disclosure. In one or more examples, a user may desire to determine how apparels would appear on his or her body. To achieve that, processing circuitry 44 may be configured to generate a plurality of virtual apparels (e.g., via execution of an apparel generating application). For example, processing circuitry 44 may execute the apparel generation application.

To create the plurality of virtual apparels, an administrator may create a pattern for an apparel (64). For example, the administrator may take an image of the apparel or find an image of the apparel (e.g., online). In some examples, a designer or user may upload the image. For example, a designer may consider the ability of users to virtually try the style and fit as good advertisement, and may therefore provide the image. As another example, a user may identify an apparel for which he or she wants to determine the style and fit for his or her body.

Based on the image, the administrator may define key points on the apparel, and primitives that are used to form the apparel. From this, the administrator may define a virtual apparel mesh, and define color for the mesh based on the color in the image. One example way for the administrator to define a first virtual apparel is as follows. If the pattern is existing in the database, then virtual apparel for that pattern is done in an automated simulation process on cloud 16. The identified pattern file is provided as input and then based on the grading of that apparel (sizes like S, M, L, XL, etc.) the right size is picked for each body (considering body size), simulated and exported. If the pattern was not existing in the database then using a CAD/CAM file (dxf file) an administrator will create the base cloth file which has stitching information for creation of the 3D mesh from the CAD/CAM file as well as the size grading information to drape that apparel on all the bodies in a simulation run.

The administrator may then load up, for display on a local display, base body types from body types 60 and modify the virtual apparel mesh to fit each of the base body types (66). A base body type is a body type for which standard sizes are generated. For example, the base body types are body types that define the standard sizes of XXS (extra-extra-small), XS, S, M (medium), L (large), XL, XXL, and XXXL. For each of these body types, the administrator may manually modify the virtual apparel mesh on top of graphical presentations of body types of body types 60 that correspond to body types for these standard sizes. The administrator may store information that indicates how the virtual apparel mesh was modified for each of the base body types.

For each body type in each category of base body types, processing circuitry 44 may generate virtual apparels corresponding to each of body types 60 based on the base body types (68). Although there is a base body type that defines each of these standard sizes, there may be a plurality of body types that each fall under the same size category. For example, there may be a plurality of body types 60 for which each of the standard sizes would fit. For instance, there may be a plurality of body types 60 that would all fit under XXS, a plurality of body types 60 that would all fit under XS, and so forth.

For each of the body types in a standard size category, processing circuitry 44 may determine a difference in the body type and the base body type. Based on the difference, processing circuitry 44 may determine deformations (e.g., morphs) to apply to the virtual apparel for the base body type, and processing circuitry 44 may generate a virtual apparel that fits the corresponding body type. Processing circuitry 44 may store graphical information for the generated virtual apparel in memory 46. These operations may be all automated, and require little or no human interference.

As an example, assume there are 100 body types that all fall under the L (large) category. For the first of the 100 body types, processing circuitry 44 may determine the difference in the first body type and the base body type for size L. Based on the difference, processing circuitry 44 may deform the virtual apparel for the base body type for size L to generate a virtual representation for the first body type. For the second of the 100 body types, processing circuitry 44 may determine the difference in the second body type and the base body type for size L. Based on the difference, processing circuitry 44 may deform the virtual apparel for the base body type for size L to generate a virtual representation for the second body type, and so forth. Processing circuitry 44 may store information for the resulting virtual apparels (e.g., virtual representations of the apparels) in memory 46 (70).

In one or more examples, processing circuitry 44 may receive information from the user regarding for which apparel he or she wants to determine the style and fit. As described above, processing circuitry 44 may select a body type for the user based on user provided body type information. Processing circuitry 44 may determine a virtual apparel from the stored virtual apparels based on the selected body type (72). For example, assume that processing circuitry 44 selected the second body type of the 100 body types for size L for the user. In this example, processing circuitry 44 may determine the virtual apparel generated for the second body type of the 100 body types for size L, as described above, based on the selected body type being the second body type of the 100 body types for size L.

Processing circuitry 44 may output graphical information based on the determined virtual apparel (74). As one example, processing circuitry 44 may render the determined virtual apparel on top of the virtual representation of the user generated using the above example techniques. In this example, the graphical information may be considered as the combination of the virtual apparel rendered on the virtual representation. As another example, processing circuitry 44 may output the graphical information for the determined virtual apparel and output the graphical information for the virtual representation. GPU 28 may then render the virtual apparel on top of the virtual representation.

In this way, an administrator may simulate apparel across body types for standard size categories, which are much less in number compared to total number of body types 60, and generate and store information for these virtual apparels (e.g., as garment files). Processing circuitry 44 may automatically simulate virtual apparels across all body types 60 belonging to these size categories. For each size category, the virtual apparel corresponding to the base body type for the base size is loaded, and then all body types in that size category are loaded one after the other as morphed targets (e.g., the targets to which the virtual apparel for the base body type for the base size are to be deformed). The steps of loading, simulation, and storing virtual apparels for the different body types, using 3D simulation software, is automated to require less human intervention.

Examples of 3D simulation software for loading, simulating, and storing include Clo3D, VStitcher, Optitex and Tukatech. In general, most any 3D garment simulation software may be used. The administrator may use automation code on top of this simulation software, such as a python script, to call these functions in the software and perform them in automated manner on cloud 16.

Figure 5:
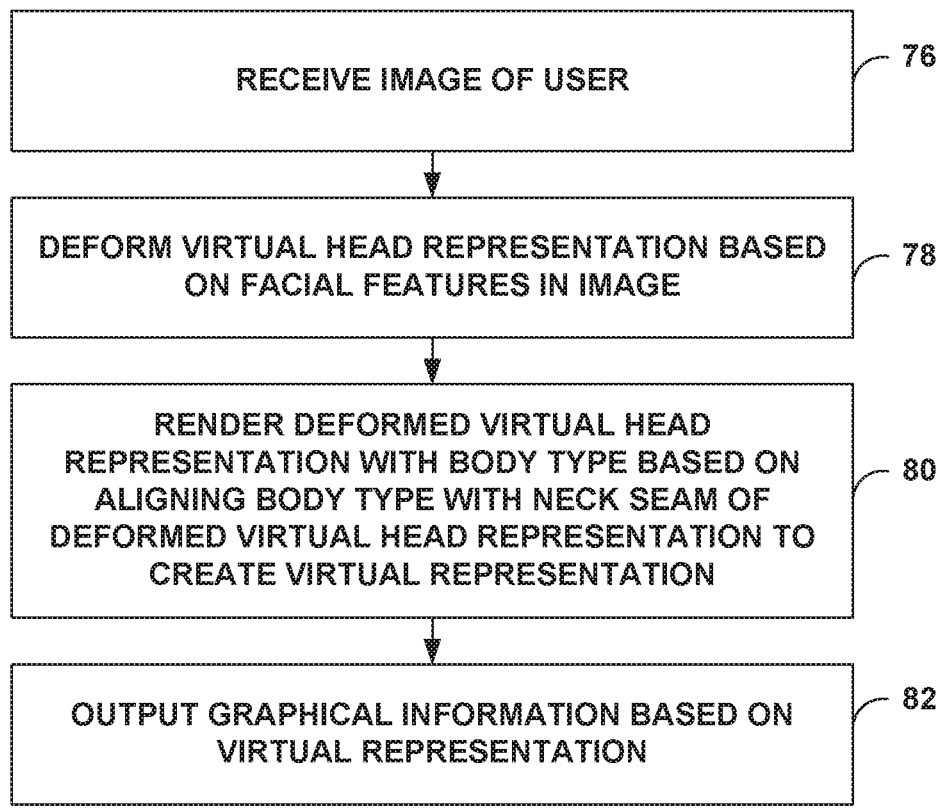
FIG. 5 is a flowchart illustrating example operations of virtual representation creation of a user.

FIG. 5 is a flowchart illustrating example operations of virtual representation creation of a user. Processing circuitry 44 may receive an image of a user (76). The image of the user includes an image of the frontal face of the user. Processing circuitry 44 may deform a virtual head representation based on facial features of the image (78).

For example, processing circuitry 44 may execute facial feature extraction module 48. Processing circuitry 44, via execution of facial feature extraction module 48, determines skin areas in a face of the user in the image, determines an average skin complexion based on the skin areas, determines impact of lighting conditions based on the average skin complexion, determines relative distances of various points on the face based on the determined impact of the lighting conditions, and determines the facial features, including face shape and contour, based on the determined relative distances.

Based on the face shape and contour, deformation application 50, executing on processing circuitry 44, determines the deformations to apply to facial contour 58 based on the face shape and contour. Deformation application 50 may then apply the determined deformations to virtual head representation 58. For example, virtual head representation 58 includes a head portion and a neck seam (e.g., the bottom of a neck portion of virtual head representation 58). Deformation application 50 may apply the determined deformations to the head portion, and avoid deforming the neck seam (e.g., keep the neck seam rigid).

Processing circuitry 44, via renderer application 54, may render the deformed virtual head representation with a body type based on aligning the body type with a neck seam of the deformed virtual head representation to create a virtual representation of the user (80). For example, as described above and described in more detail with respect to FIG. 6, processing circuitry 44, via execution of body type selector application 52, may select a body type for the user. The body type that processing circuitry 44 selects may be from body types 60 that are specifically constructed such that the neck seam of the body types 60 aligns substantially with the neck seam of virtual head representation 58 (e.g., so that the ends of the neck seams line up, and the curvature of the neck seams line up). As described above, alignment of the neck seams means that the ends of the neck seams line up, and the curvature of the neck seams line up such that the neck seam of the virtual head representation and the neck seam of the body type line up to form a contiguous connection between head and body, with little to no gaps or such that the neck seam of the virtual head representation does not extend beyond the neck seam of the body type, and vice-versa.

Because the neck seam of virtual head representation 58 was not deformed during the deformation of virtual head representation 58, a neck seam of the deformed virtual head representation substantially aligns with the neck seam of the selected body type.

Accordingly, renderer application 54 may blend the neck seam of the deformed virtual head representation with the neck seam of the selected body type to create a virtual representation of the user.

Furthermore, in some examples, renderer application 54 may render skin color and facial texture to the deformed virtual head representation. In such examples, renderer application 54 may render the deformed virtual head representation having the skin color and facial texture with the body type (e.g., the selected body type selected by body type selector application 52).

Processing circuitry 44 may output graphical information based on the virtual representation (82). For example, processing circuitry 44 may output commands and graphics data in accordance with OpenGL such that GPU 28 of personal computing device 12 can interpret the commands and data and reconstruct the virtual representation on personal computing device 12.

Figure 6:
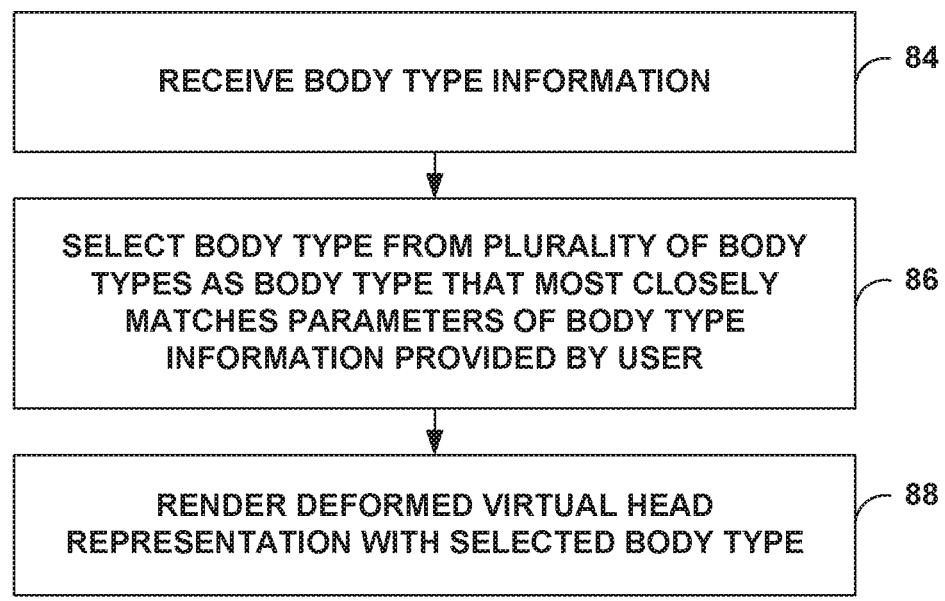
FIG. 6 is a flowchart illustrating example operations of selecting a body type for generating a virtual representation of a user.

FIG. 6 is a flowchart illustrating example operations of selecting a body type for generating a virtual representation of a user. In some examples, processing circuitry 44 receives body type information of the user (84). As one example, the user inputs height, weight, waist, bust/chest, etc. as body type parameters for the body type information. As another example, the user may provide a full body image from which processing circuitry 44 may determine the body type information.

Body type selector application 52, executing on processing circuitry 44, may select a body type from body types 60 as the body type that most closely matches the parameters of the body type information provided by the user (e.g., via input or via the image) (86). As one example, body type selection application 52 may determine a first subset of body types 60 from the plurality of body types 60 having the same parameter as a first parameter of the received body type information (e.g., determine body types 60 having the same height parameter as the height parameter of the received body type information). Body type selector application 52 may determine a second subset, from the first subset, having the same parameter as a second parameter of the received body type information (e.g., determine body types 60 from the first subset having the same waist parameter as the waist parameter of the received body type information).

Body type selector application 52 may determine a body type from the second subset of body types as a closest match to the received body type information to select the body type. For example, body type selector application 52 may determine a Euclidean distance between each body type in the second subset and determine which one of the body types in the second subset has the smallest distance. If there is a tie between multiple body types, then body type selector application 52 may utilize a tie breaking algorithm. For instance, body type selector application 52 may determine among the body types having the same Euclidean distance, which one has a third parameter that is closest to a third parameter of the user provided body type information, and try the fourth parameter, fifth parameter, and so on, until body type selector application 52 finds a body type where there is no tie. Body type selection application 52 may select that body type as the body type that is the closest match to the body type of the user.

Renderer application 54 may render the deformed virtual head representation with the selected body type (88). For example, as described above, renderer application 54 may blend the neck seam of the deformed virtual head representation with the neck seam of the selected body type to create the virtual representation of the user.

Figure 7:
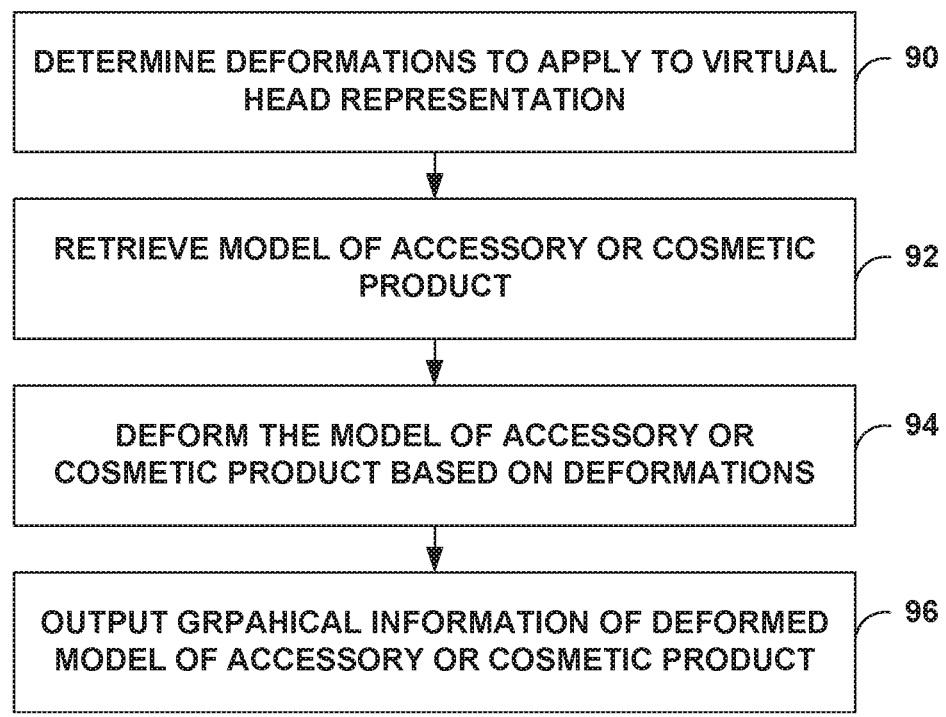
FIG. 7 is a flowchart illustrating example operations of generating virtual representation accessories or cosmetics to apply to a virtual representation of a user.

FIG. 7 is a flowchart illustrating example operations of generating a virtual representation accessories or cosmetics to apply to a virtual representation of a user. As described above, during the deformations performed to virtual head representation 58, deformation application 50 may determine the deformations to apply to virtual head representation 58 based on the facial features in the image of the face of the user (90).

Processing circuitry 44 may receive information indicating for which one of accessories from accessories 62 a user wants to determine the style and fit. Deformation application 50 may retrieve a model of accessory from accessories 62 or cosmetic product based on the user selection (92).

Deformation application 50 may deform the model of the accessory product or cosmetic product based on the determined deformations that deformation application had determined to be applied to virtual head representation 58 (94). As described above, accessories 62 may be pre-registered in spatial alignment with virtual head representation 58, which means that virtual representations of the accessories (e.g., accessories 62) may be formed such that accessories 62 fit on virtual head representation 58. Therefore, deformations applied to virtual head representation 58 may be indicative of deformations to be applied to accessories 62 for fast construction of accessories and how they will look on the user. For example, deformation application 50 may scale, shift, expand, contract, etc. the model of the accessory based on the deformations applied to virtual head representation 58.

Processing circuitry 44 may output graphical information of the deformed model of the accessory or cosmetic product (96). As one example, renderer application 54 may render the deformed model of the accessory on-top-of the virtual representation of the user, and processing circuitry 44 may output graphical information for the combined virtual representation of the user with the deformed model of the accessory (e.g., virtual representation of the accessory). As another example, renderer application 54 may output the virtual representation of the user and output the virtual representation of the accessory. GPU 28 may then stitch the virtual representation of the accessory to the virtual representation of the user.

Figure 8:
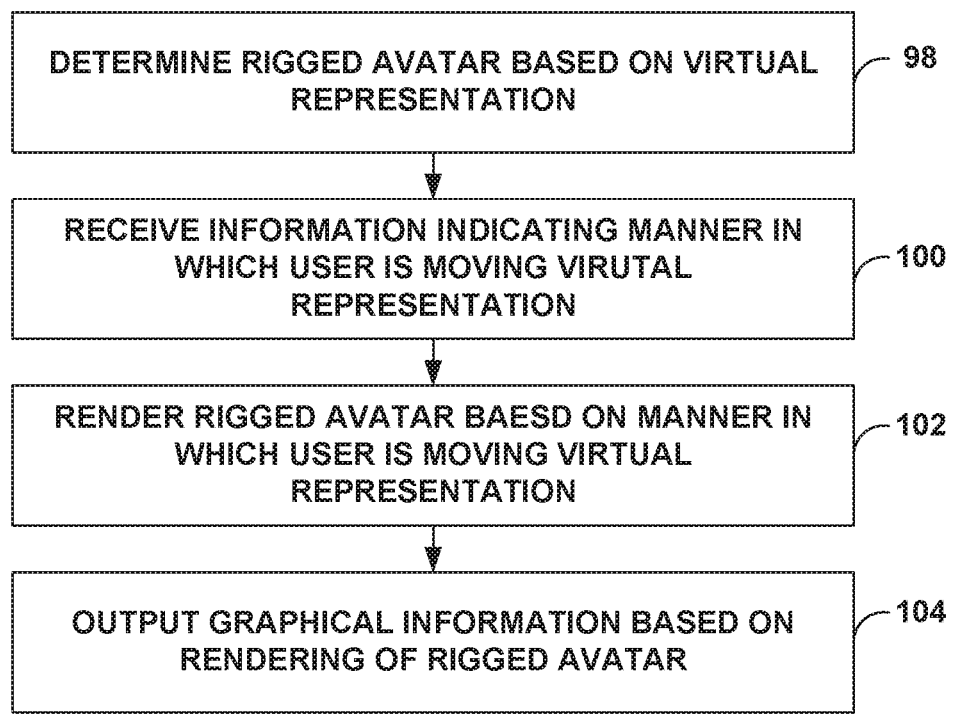
FIG. 8 is a flowchart illustrating example operations of rendering a virtual representation for movement.

FIG. 8 is a flowchart illustrating example operations of rendering a virtual representation for movement. In some examples, processing circuitry 44 may determine a rigged avatar based on the virtual representation of the user (98). The rigged avatar includes graphical information of a skeleton and muscle tissue of the virtual representation. For instance, in some examples, virtual head representation 58 and body types 60 may include rigged information such as information about the skeleton and muscle tissue, and processing circuitry 44 may create the virtual representation of the user using such rigged information. The result is a so-called rigged avatar that can better mimic the user movement because skeletal and muscle information can be used to determine how the user will appear when moving.

For example, processing circuitry 44 may receive information indicating a manner in which the user is moving the virtual representation (100). In response, renderer application 54 may render the rigged avatar based on the manner in which the user is moving the virtual representation (102). Processing circuitry 44 may output the graphical information based on the rendering of the rigged avatar (104). In some examples, processing circuitry 44 may determining a manner in which graphical clothing flows based on the manner in which the user is moving the virtual representation. In such examples, processing circuitry 44 may output the graphical information based on the rendering of the rigged avatar and the manner in which the graphical clothing is flowing The techniques of this disclosure may be implemented in a wide variety of computing devices. Any of the described units, modules or components may be implemented together or separately as discrete but interoperable logic devices. Depiction of different features as applications or units is intended to highlight different functional aspects and does not necessarily imply that such applications or units must be realized by separate hardware or software components. Rather, functionality associated with one or more applications or units may be performed by separate hardware or software components, or integrated within common or separate hardware or software components.

The techniques described in this disclosure may be implemented, at least in part, in hardware, software, firmware or any combination thereof. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry. The terms "processor," "processing circuitry," "controller" or "control module" may generally refer to any of the foregoing logic circuitry, alone or in combination with other logic circuitry, or any other equivalent circuitry, and alone or in combination with other digital or analog circuitry.

For aspects implemented in software, at least some of the functionality ascribed to the systems and devices described in this disclosure may be embodied as instructions on a computer-readable storage medium such as random access memory (RAM), read-only memory (ROM), non-volatile random access memory (NVRAM), electrically erasable programmable read-only memory (EEPROM), FLASH memory, magnetic media, optical media, or the like that is tangible. The computer-readable storage media may be referred to as non-transitory. A server, client computing device, or any other computing device may also contain a more portable removable memory type to enable easy data transfer or offline data analysis. The instructions may be executed to support one or more aspects of the functionality described in this disclosure.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the devices, systems, and methods in accordance with the description provided in this disclosure are provided below.

The invention claimed is:

1. A method of virtual representation creation, the method comprising:
   receiving an image of a user;
   determining skin areas in a face of the user in the image;
   determining an average skin complexion based on the skin areas;
   determining impact of lighting conditions based on the average skin complexion;
   determining relative distances of various points on the face based on the determined impact of the lighting conditions;
   determining the facial features, including face shape and facial contour, based on the determined relative distances;
   determining deformations to apply to the facial contour based on the face shape and facial contour;
   deforming a virtual head representation based on the determined deformations, wherein the virtual head representation includes a head portion and a neck seam, and wherein deforming the virtual head representation comprises deforming the head portion, and avoiding deforming the neck seam;
   rendering the deformed virtual head representation with a body type based on aligning the body type with a neck seam of the deformed virtual head representation to create a virtual representation of the user; and
   outputting graphical information based on the virtual representation of the user.

2. The method of claim 1, further comprising:
   receiving body type information of the user; and
   selecting a body type from a plurality of body types based on the received body type information,
   wherein rendering the deformed virtual head representation with the body type comprises rendering the deformed virtual head representation with the selected body type.

3. The method of claim 2, wherein selecting the body type comprises:
   determining a first subset of body types from the plurality of body types having the same parameter as a first parameter of the received body type information;
   determining, from the first subset of body types, a second subset of body types having the same parameter as a second parameter of the received body type information; and
   determining a body type from the second subset of body types based on comparisons between the received body type information and body types in the second subset of body types to select the body type.

4. The method of claim 1, further comprising:
   retrieving a model of an accessory, wherein the model is pre-registered in spatial alignment with the virtual head representation;
   deforming the model of the accessory based on the determined deformations; and
   outputting graphical information of the deformed model of the accessory.

5. The method of claim 1, further comprising:
   rendering skin color and facial texture to the deformed virtual head representation,
   wherein rendering the deformed virtual head representation with the body type comprises rendering the deformed virtual head representation having the skin color and facial texture with the body type.

6. The method of claim 1, further comprising:
   determining a rigged avatar as the virtual representation of the user, wherein the rigged avatar includes graphical information of a skeleton and muscle tissue of the virtual representation;
   receiving information indicating a manner in which the user is moving the virtual representation;
   rendering the rigged avatar based on the manner in which the user is moving the virtual representation; and
   outputting graphical information based on the rendering of the rigged avatar.

7. The method of claim 6, further comprising:
   determining a manner in which graphical clothing flows based on the manner in which the user is moving the virtual representation,
   wherein outputting the graphical information comprises outputting the graphical information based on the rendering of the rigged avatar and the manner in which the graphical clothing is flowing.

8. The method of claim 1, further comprising:
   receiving information for virtual apparels for a plurality of base body types;
   generating virtual apparels for a plurality of body types based on information for virtual apparels for the plurality of base body types; and
   determining a virtual apparel of the generated virtual apparels that corresponds with the body type,
   wherein outputting the graphical information comprises outputting the graphical information based on the determined virtual apparel and the virtual representation of the user.

9. A system comprising:
   memory configured to store a virtual head representation; and
   processing circuitry configured to:
      receive an image of a user;
      determine skin areas in a face of the user in the image;
      determine an average skin complexion based on the skin areas;

determine impact of lighting conditions based on the average skin complexion;
determine relative distances of various points on the face based on the determined impact of the lighting conditions;
determine the facial features, including face shape and facial contour, based on the determined relative distances;
determine the deformations to apply to the facial contour based on the face shape and facial contour;
deform a virtual head representation based on the determined deformations, wherein the virtual head representation includes a head portion and a neck seam, and wherein to deform the virtual head representation, the processing circuitry is configured to deform the head portion, and avoid deforming the neck seam;
render the deformed virtual head representation with a body type based on aligning the body type with a neck seam of the deformed virtual head representation to create a virtual representation of the user; and
output graphical information based on the virtual representation of the user.

10. The device of claim 9, wherein the memory is configured to store a plurality of body types, and wherein the processing circuitry is configured to:
receive body type information of the user; and
select a body type from the plurality of body types based on the received body type information,
wherein to render the deformed virtual head representation with the body type, the processing circuitry is configured to render the deformed virtual head representation with the selected body type.

11. The device of claim 10, wherein to select the body type, the processing circuitry is configured to:
determine a first subset of body types from the plurality of body types having the same parameter as a first parameter of the received body type information;
determine, from the first subset of body types, a second subset of body types having the same parameter as a second parameter of the received body type information; and
determine a body type from the second subset of body types based on comparisons between the received body type information and body types in the second subset of body types to select the body type.

12. The device of claim 9, wherein the processing circuitry is configured to:
retrieve a model of an accessory, wherein the model is pre-registered in spatial alignment with the virtual head representation;
deform the model of the accessory based on the determined deformations; and
output graphical information of the deformed model of the accessory.

13. The device of 9, wherein the processing circuitry is configured to:
render skin color and facial texture to the deformed virtual head representation,
wherein to render the deformed virtual head representation with the body type, the processing circuitry is configured to render the deformed virtual head representation having the skin color and facial texture with the body type.

14. The device of claim 9, wherein the processing circuitry is configured to:

determine a rigged avatar as the virtual representation of the user, wherein the rigged avatar includes graphical information of a skeleton and muscle tissue of the virtual representation;
receive information indicating a manner in which the user is moving the virtual representation;
render the rigged avatar based on the manner in which the user is moving the virtual representation; and
output graphical information based on the rendering of the rigged avatar.

15. The device of claim 14, wherein the processing circuitry is configured to:
determine a manner in which graphical clothing is flow based on the manner in which the user is moving the virtual representation,
wherein to output the graphical information, the processing circuitry is configured to output the graphical information based on the rendering of the rigged avatar and the manner in which the graphical clothing is flowing.

16. The device of claim 9, wherein the processing circuitry is configured to:
receive information for virtual apparels for a plurality of base body types;
generate virtual apparels for a plurality of body types based on information for virtual apparels for the plurality of base body types; and
determine a virtual apparel of the generated virtual apparels that corresponds with the body type,
wherein to output the graphical information, the processing circuitry is configured to output the graphical information based on the determined virtual apparel and the virtual representation of the user.

17. A computer-readable storage medium storing instructions that when executed cause processing circuitry to:
receive an image of a user;
determine skin areas in a face of the user in the image;
determine an average skin complexion based on the skin areas;
determine impact of lighting conditions based on the average skin complexion;
determine relative distances of various points on the face based on the determined impact of the lighting conditions;
determine the facial features, including face shape and facial contour, based on the determined relative distances;
determine the deformations to apply to the facial contour based on the face shape and facial contour;
deform a virtual head representation based on the determined deformations, wherein the virtual head representation includes a head portion and a neck seam, and wherein the instructions that cause the processing circuitry to deform the virtual head representation comprise instructions that cause the processing circuitry to deform the head portion, and avoid deforming the neck seam;
render the deformed virtual head representation with a body type based on aligning the body type with a neck seam of the deformed virtual head representation to create a virtual representation of the user; and
output graphical information based on the virtual representation of the user.

18. The computer-readable storage medium of claim 17, further comprising instructions that cause the processing circuitry to:
receive body type information of the user; and select a body type from a plurality of body types based on the received body type information, wherein the instructions that cause the processing circuitry to render the deformed virtual head representation with the body type comprise instructions that cause the processing circuitry to render the deformed virtual head representation with the selected body type.

\* \* \* \* \*